US 11,805,305 B2

(12) United States Patent
Moon et al.

(10) Patent No.: US 11,805,305 B2
(45) Date of Patent: *Oct. 31, 2023

(54) CAMERA MODULE INCLUDING A LENS THAT ROTATES AND MOVES ABOUT AT LEAST TWO AXES AND ELECTRONIC DEVICE INCLUDING THE SAME

(71) Applicant: Samsung Electronics Co., Ltd., Gyeonggi-do (KR)

(72) Inventors: Chanyoung Moon, Gyeonggi-do (KR); Yeonhak Kim, Gyeonggi-do (KR); Hyungjin Rho, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/957,093

(22) Filed: Sep. 30, 2022

(65) Prior Publication Data

US 2023/0036676 A1 Feb. 2, 2023

Related U.S. Application Data

(63) Continuation of application No. 17/144,901, filed on Jan. 8, 2021, now Pat. No. 11,463,607.

(30) Foreign Application Priority Data

Jan. 10, 2020 (KR) .................. 10-2020-0003934

(51) Int. Cl.
*H04N 23/51* (2023.01)
*G03B 30/00* (2021.01)
(Continued)

(52) U.S. Cl.
CPC .............. *H04N 23/51* (2023.01); *G02B 7/09* (2013.01); *G02B 27/646* (2013.01); *G03B 5/00* (2013.01);
(Continued)

(58) Field of Classification Search
CPC .... H04N 5/2252; H04N 5/2257; H04N 23/51; H04N 23/695; H04N 23/57; G03B 30/00;
(Continued)

(56) References Cited

U.S. PATENT DOCUMENTS 8,238,736 B2 8/2012 Tsuruta et al.
8,903,230 B2 12/2014 Shikama et al.
(Continued)

FOREIGN PATENT DOCUMENTS

CN 110572556 12/2019
JP 2019-053271 4/2019
(Continued)

OTHER PUBLICATIONS

International Search Report dated Apr. 19, 2021 issued in counterpart application No. PCT/KR2021/000279, 3 pages.
(Continued)

*Primary Examiner* — Nicholas G Giles
(74) *Attorney, Agent, or Firm* — The Farrell Law Firm, P.C.

(57) ABSTRACT

A camera module is provided, which includes a camera housing, a camera assembly including a lens, the camera assembly being rotatable about a first axis and a second axis substantially perpendicular to an optical axis of the lens with respect to the camera housing, and a guide plate connected to the camera assembly and the camera housing. The camera assembly further includes a first corner area and a second corner area substantially facing a direction of the first axis and facing each other, and a third corner area and a fourth corner area substantially facing the second axis and facing each other. The fourth corner area includes a chamfer area. The guide plate includes a first portion and a second portion rotatably connected to the camera assembly about the first (Continued)

axis, and a third portion and a fourth portion rotatably connected to the camera housing about the second axis.

20 Claims, 18 Drawing Sheets

(51) Int. Cl.
    *G02B 27/64*     (2006.01)
    *G03B 5/00*     (2021.01)
    *G03B 13/36*     (2021.01)
    *G02B 7/09*     (2021.01)
    *H04N 23/57*     (2023.01)
    *H04N 23/695*     (2023.01)

(52) U.S. Cl.
    CPC ............. *G03B 13/36* (2013.01); *G03B 30/00* (2021.01); *H04N 23/57* (2023.01); *H04N 23/695* (2023.01); *G03B 2205/0023* (2013.01)

(58) Field of Classification Search
    CPC . G03B 5/00; G03B 13/36; G02B 7/09; G02B 27/646
    See application file for complete search history.

(56) References Cited

U.S. PATENT DOCUMENTS

| | | | |
|---|---|---|---|
| 9,332,188 B2 | 5/2016 | Takei et al. | |
| 9,527,161 B2 | 12/2016 | Watanabe et al. | |
| 9,933,629 B2 | 4/2018 | Minamisawa | |
| 11,409,124 B2* | 8/2022 | Sue | H04N 23/57 |
| 11,463,607 B2* | 10/2022 | Moon | G02B 27/646 |
| 2006/0285006 A1 | 12/2006 | Shin et al. | |
| 2011/0103782 A1 | 5/2011 | Tsuruta et al. | |
| 2013/0121672 A1 | 5/2013 | Shikame et al. | |
| 2014/0139693 A1 | 5/2014 | Takei et al. | |
| 2015/0062706 A1 | 3/2015 | Lim et al. | |
| 2015/0336211 A1 | 11/2015 | Watanabe et al. | |
| 2016/0124242 A1 | 5/2016 | Minamisawa | |
| 2019/0215463 A1 | 7/2019 | Shirane et al. | |
| 2021/0041714 A1* | 2/2021 | Sue | H02K 41/0356 |
| 2022/0224807 A1 | 7/2022 | Lu et al. | |

FOREIGN PATENT DOCUMENTS

| | | |
|---|---|---|
| KR | 1020150024653 | 3/2015 |
| KR | 1020170106185 | 9/2017 |
| KR | 1020190029169 | 3/2019 |

OTHER PUBLICATIONS

European Search Report dated Dec. 7, 2022 issued in counterpart application No. 21738513.7-1208, 9 pages.

* cited by examiner

CAMERA MODULE INCLUDING A LENS THAT ROTATES AND MOVES ABOUT AT LEAST TWO AXES AND ELECTRONIC DEVICE INCLUDING THE SAME

CROSS-REFERENCE TO RELATED APPLICATION(S)

This application is a continuation of U.S. application Ser. No. 17/144,901, which was filed in the U.S. Patent and Trademark Office on Jan. 8, 2021, and claims the priority under 35 U.S.C. § 119(a) to Korean Patent Application Serial No. 10-2020-0003934, which was filed in the Korean Intellectual Property Office on Jan. 10, 2020, the entire disclosure of each of which is incorporated herein by reference.

BACKGROUND

1. Field

The disclosure relates generally to a camera module and an electronic device including the same.

2. Description of the Related Art

An electronic device may include one or more camera modules. A camera module may have an auto focusing function by which a lens moves in an optical axis direction in order to auto focus the lens. The electronic device may also have a function for compensating for shaking of the camera module. For example, to compensate for shaking, the lens may move in a direction other than the optical axis direction in order to compensate for vibration applied to the camera module.

A camera module may support various functions, such as a function related to image stabilization and/or a function related to auto focusing. However, in a conventional camera module, only a lens may move or rotate, and an image sensor thereof is fixed during image stabilization, and thus, an acquired image may deteriorate in quality.

SUMMARY

The disclosure has been made to address at least the disadvantages described above and to provide at least the advantages described below.

An aspect of the disclosure is to provide an electronic device including a camera module having an auto focusing function through which a lens moves in an optical axis direction and/or a function through which the lens rotates and moves about at least two axes.

In accordance with an aspect of the disclosure, a camera module is provided. The camera module includes a camera housing; a camera assembly including a lens, the camera assembly being accommodated in the camera housing and being rotatable about a first axis and a second substantially perpendicular to an optical axis of the lens with respect to the camera housing; and a guide plate connected to the camera assembly and the camera housing. The camera assembly further includes a first corner area and a second corner area substantially facing a direction of the first axis and facing each other, and a third corner area and a fourth corner area substantially facing a direction of the second axis and facing each other. The fourth corner area includes a chamfer area formed therein. The guide plate includes a first portion and a second portion rotatably connected to the camera assembly about the first axis, and a third portion and a fourth portion rotatably connected to the camera housing about the second axis. At least a portion of the first portion faces and is spaced apart from the first corner area, at least a portion of the second portion faces and is spaced apart from the second corner area, at least a portion of the third portion faces and is spaced apart from the third corner area, and at least a portion of the fourth portion faces and is spaced apart from the fourth corner area.

In accordance with another aspect of the disclosure, a portable communication device is provided. The portable communication device includes a display; and a camera module including a camera housing; a camera assembly including a lens, the camera assembly being accommodated in the camera housing and being rotatable about a first axis and a second substantially perpendicular to an optical axis of the lens with respect to the camera housing; and a guide plate connected to the camera assembly and the camera housing. The camera assembly further includes a first corner area and a second corner area substantially facing a direction of the first axis and facing each other, and a third corner area and a fourth corner area substantially facing a direction of the second axis and facing each other. The fourth corner area includes a chamfer area formed therein. The guide plate includes a first portion and a second portion rotatably connected to the camera assembly about the first axis, and a third portion and a fourth portion rotatably connected to the camera housing about the second axis. At least a portion of the first portion faces and is spaced apart from the first corner area, at least a portion of the second portion faces and is spaced apart from the second corner area, at least a portion of the third portion faces and is spaced apart from the third corner area, and at least a portion of the fourth portion faces and is spaced apart from the fourth corner area.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, various embodiments of the disclosure will be described with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
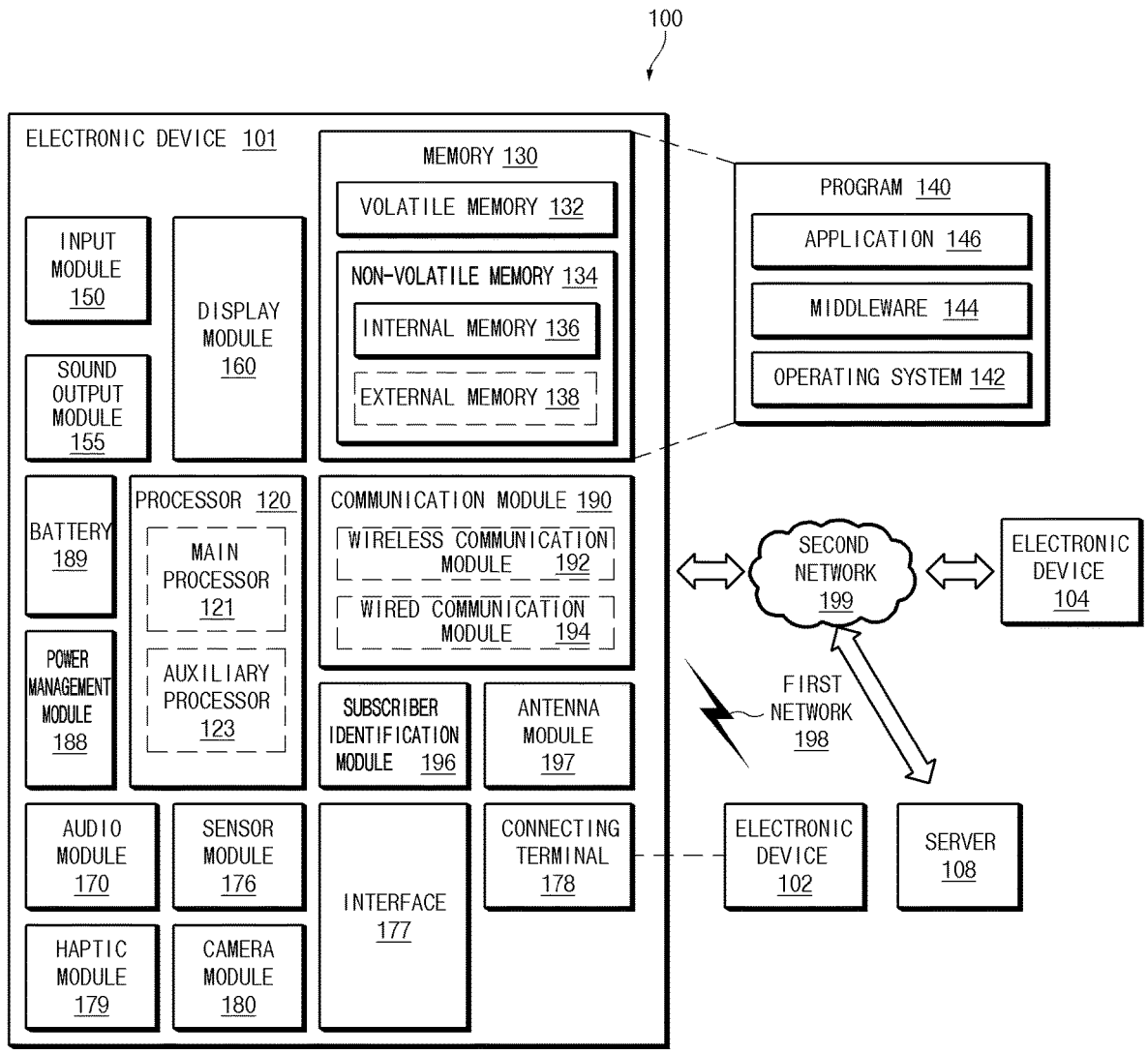
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 110) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor s in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DIN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the nonvolatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various in technologies for securing performance on a high-frequency band, such as, e.g., beamforming, massive multiple-input and multiple-output (MIMO), full dimensional (FD)-MIMO, array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164$d$B or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface, and capable of supporting a designated high-frequency band (e.g., the mmWave band), and a plurality of antennas (e.g., array antennas) disposed on a second surface (e.g., the top or a side surface) of the printed circuit board, or adjacent to the second surface, and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 110) including one or more instructions that are stored in a storage medium (e.g., internal memory 136 or external memory 138) that is readable by a machine (e.g., the electronic device 101), For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
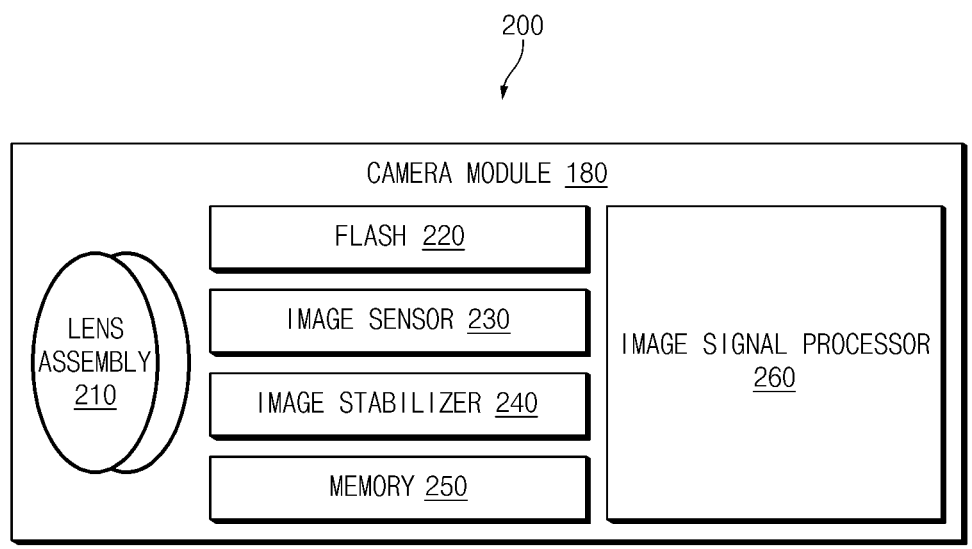
FIG. 2 illustrates a camera module according to an embodiment.

FIG. 2 illustrates a camera module 180 according to an embodiment.

Referring to FIG. 2, the camera module 180 may include a lens assembly 210 (e.g., including a lens 431 and a lens barrel 432 of FIG. 5), a flash 220, an image sensor 230 (e.g., an image sensor 419 of FIG. 13), an image stabilizer 240, a memory 250 (e.g., a buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 210 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180, According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. For example, a plurality of camera modules 180 including lenses (e.g., the lens assembly 210) having different viewing angles may be provided, and a change in viewing angle of the camera module 180, which is performed in the electronic device 101, may be controlled based on user's selection. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera. In addition, the plurality of camera modules 180 may include at least one of a wide-angle camera, a telephoto camera, or an IR camera (e.g., a time of flight (TOF) camera), or a structured light camera. According to an embodiment, the IR camera may operate as at least a portion of the sensor module (e.g., the sensor module 176 of FIG. 1). For example, the TOF camera (e.g., the TOF camera 316 of FIG. 3B) may operate as at least a portion of the sensor module (e.g., the sensor module 176 of FIG. 1) for sensing a distance from a component.

Figure 3A:
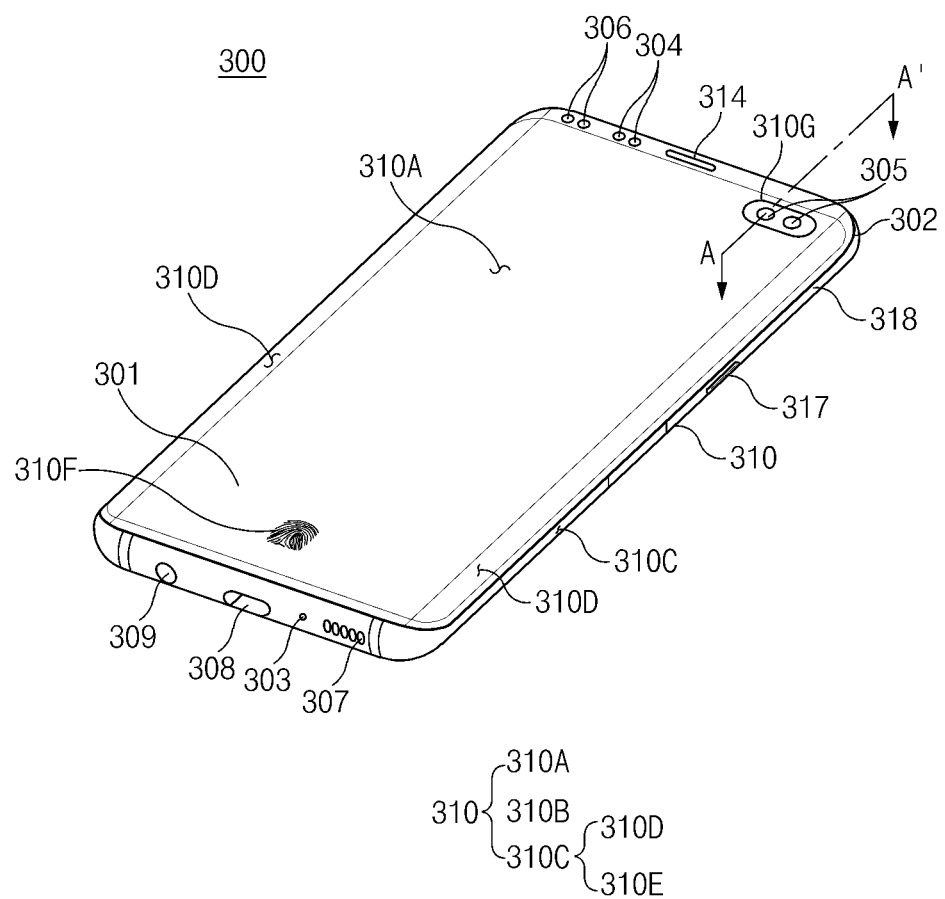
FIG. 3A illustrates a front perspective view of an electronic device according to an embodiment.

FIG. 3A illustrates a front perspective view of an electronic device according to an embodiment. HG. 3B illustrates a rear perspective view of an electronic device according to an embodiment. FIG. 3C illustrates an exploded perspective view of an electronic device according to an embodiment.

Figure 3B:
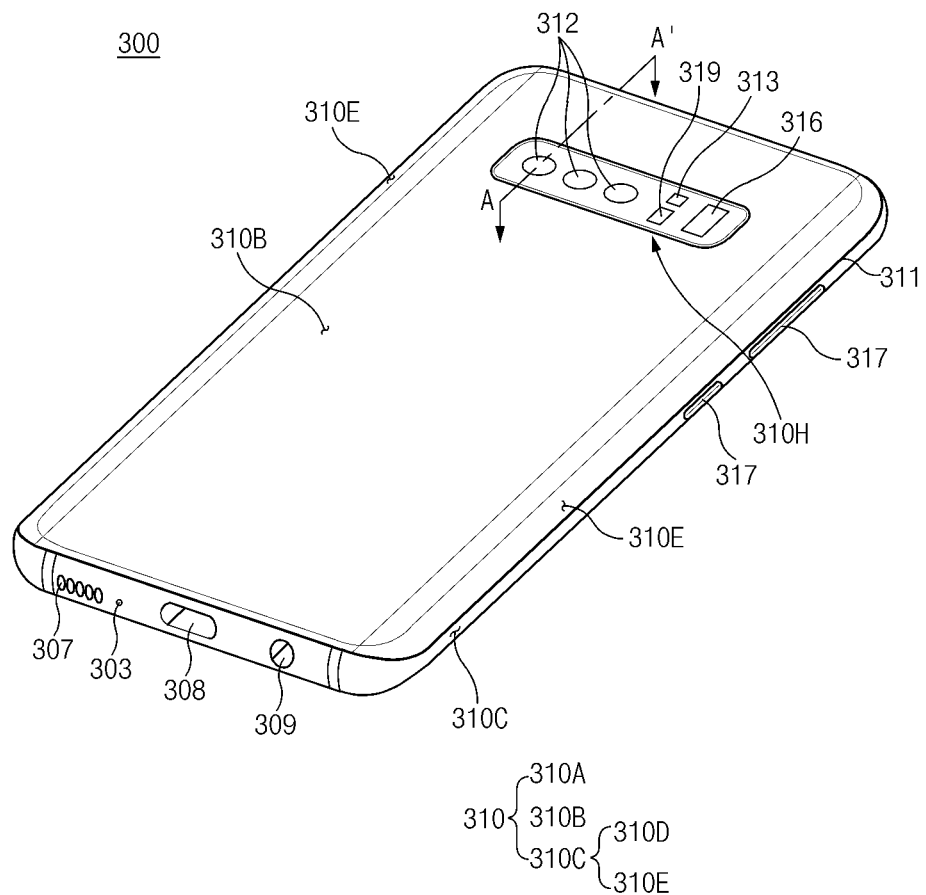
FIG. 3B illustrates a rear perspective view of an electronic device according to an embodiment.
Figure 3C:
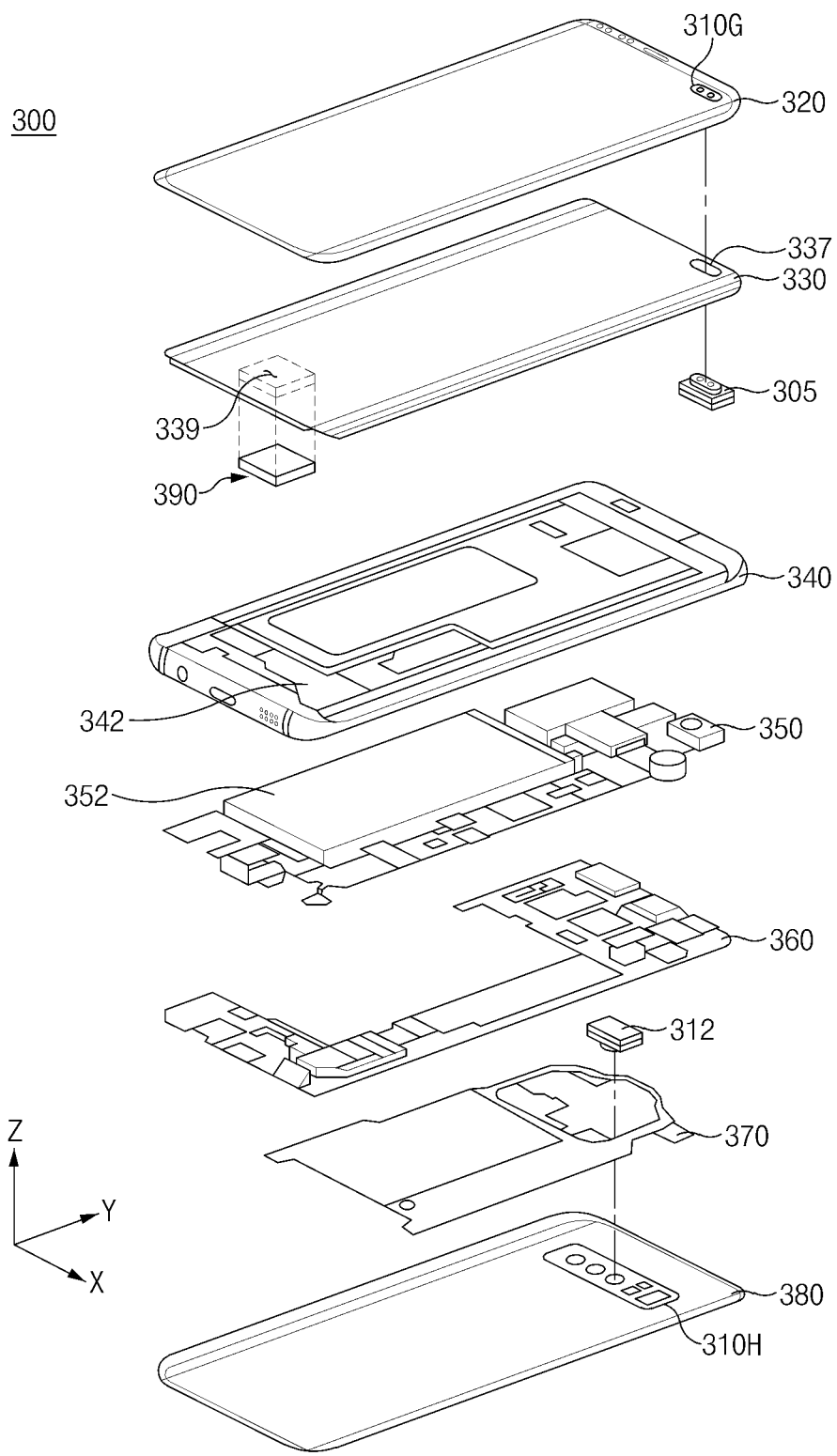
FIG. 3C illustrates an exploded perspective view of an electronic device according to an embodiment.

Referring to FIGS. 3A and 3B, an electronic device 300 includes a housing 310 having a first surface (or front surface) 310A, a second surface (or rear surface) 310B, and a side surface 310C surrounding a space defined between the first surface 310A and the second surface 310B.

Alternatively, the housing 310 may refer to a structure defining some of the first surface 310A, the second surface 310B, and the side surfaces 3100 of FIG. 1.

At least a portion of the first surface 310A may be defined by a substantially transparent front plate 302 (e.g., a glass plate including various coating layers, or a polymer plate). The second surface 310B may be defined by a substantially opaque rear plate 311. The back plate 311 may be defined by applied or colored glass, ceramic, a polymer, metal (e.g., aluminum, stainless steel (STS), or magnesium), or a combination of at least two of the above materials. The side surface 3100 may be coupled to the front plate 302 and the rear plate 311 and may be defined by a side bezel structure (or "frame structure") 318 including metal and/or a polymer.

The back plate 311 and the side bezel structure 318 may be integrated with each other and include the same material (e.g., a metal material such as aluminum).

The front plate 302 includes two first areas 310D, which are curved toward the rear plate 311 from the first surface 310A and extend seamlessly, on both ends of each of long edges of the front plate 302.

The rear plate 311 includes two second areas 310E, which are curved toward the front plate 302 from the second surface 310B and extend seamlessly, on both ends of each of long edges of the rear plate 311.

Alternatively, the front plate 302 (or the rear plate 311) may include only one of the first areas 310D (or the second areas 310E), or the front plate 302 (or the rear plate 311) may not include a portion of the first areas 310D (or the second areas 310E).

When viewed from a side of the electronic device 300, the side bezel structure 318 may have a first thickness (or a width) at a side (e.g., a short side) that belongs to the first areas 310D or the second areas 310E as described above and a second thickness less than the first thickness at a side (e.g., a long side) that is included in the first areas 310D or the second areas 310E.

The electronic device 300 includes a display 301, audio modules 303, 307, and 314, sensor modules 304, 316, and 319, camera modules 305 and 312, a key input device 317, a light emitting element 306, and connector holes 308 and 309. Alternatively, at least one of the components (e.g., the key input device 317 or the light emitting element 306) may be omitted from the electronic device 300, or other components may be added.

The display 301 may be exposed through a corresponding portion of the front plate 302. At least a portion of the display 301 may be exposed through the front plate 302 including the first surface 310A and the first areas 310D of the side surface 310C.

An edge of the display 301 may have substantially the same shape as an adjacent outer shape of the front plate 302. Alternatively, in order to expand the area to which the display 301 is exposed, a distance between an outer portion of the display 301 and an outer portion of the front plate 302 may be substantially uniform.

A surface of the housing 310 (or the front plate 302) may include a screen display area defined as the display 301 is visually exposed. For example, the screen display area includes the first surface 3101 and the first areas 310D of the side surface.

The screen display areas 310A and 310D include a sensing area 310E configured to acquire biometric information of a user. Here, "the screen display areas 310A and 310D include the sensing area 310F" indicate that at least a portion of the sensing area 310A overlaps the screen display areas 310A and 310D. For example, the sensing area 310F may be capable of displaying visual information through the display 301, like other areas of the screen display areas 310A and 310D, but is capable of additionally acquiring the user's biometric information (e.g., a fingerprint).

The screen display areas 310A and 310D of the display 301 include an area 310G to which the first camera module 305 (e.g., a punch hole camera) is visually exposed. For example, at least a portion of an edge of the area 3100 to which the first camera module 305 is exposed may be surrounded by the screen display areas 310A and 310D, The first camera module 305 may include a plurality of camera modules.

A recess or opening may be defined in a portion of the screen display areas 310A and 310D of the display 301, and at least one or more of the audio module 314, the first sensor module 304, and the light emitting element 306, which are aligned with the recess or opening, may be disposed on the portion of the screen display areas 310A and 310D.

At least one or more of the audio module 314, the sensor modules 304, 316, and 319, and the light emitting element 306 may be disposed on rear surfaces of the screen display areas 310A and 310D of the display 301.

The display 301 may be coupled to or disposed adjacent to a touch sensing circuit, a pressure sensor that is capable of measuring an intensity (pressure) of touch, and/or a digitizer that detects a magnetic field-type stylus pen.

At least a portion of the sensor modules 304, 316, and 319 and/or at least a portion of the key input device 317 may be disposed on the side surface 310C (e.g., the first areas 310D and/or the second areas 310E).

The audio modules 303, 307, and 314 may include a microphone hole 303 and speaker holes 307 and 314. A microphone for acquiring external sound may be disposed inside the microphone hole 303, and a plurality of microphones may be disposed inside the microphone hole 303 in order to sense a direction of the sound. The speaker holes 307 and 314 may include an external speaker hole 307 and a call receiver hole 314. The speaker holes 307 and 314 and the microphone hole 303 may be implemented as a single hole, or a speaker may be provided without the speaker holes 307 and 314 (e.g., a piezo speaker).

The sensor modules 304, 3:1.6, and 319 may generate electrical signals or data values corresponding to an internal operating state of the electronic device 300 or an external environmental state. The sensor modules 304, 316, and 319 may include a first sensor module 304 (e.g., a proximity sensor) disposed on the first surface 310A of the housing 310, a second sensor module 316 (e.g., the TOF camera module) disposed on the second surface 310B of the housing 310, a third sensor module 319 (e.g., a heart rate monitor (HRM) sensor) disposed on the second surface 310B of the housing 310, and/or a fourth sensor module 390 (e.g., a fingerprint sensor) coupled to the display 301.

The second sensor module 316 may include the TOF camera module for measuring a distance.

At least a portion of the fourth sensor module 390 may be disposed under the screen display areas 310A and 310D. The fourth sensor module may be disposed in a recess 339 defined in the rear surface of the display 301. For example, the fourth sensor module 390 is not exposed to the screen display areas 310A and 310D, and a sensing area 310F may be defined on at least a portion of the screen display areas 310A and 310D. The fingerprint sensor may be disposed on the second surface 310B as well as the first surface 310A (e.g., the screen display areas 310A and 310D) of the housing 310.

The electronic device 300 may further include sensor modules, for example, a gesture sensor, a gyro sensor, an atmospheric pressure sensor, a magnetic sensor, an acceleration sensor, a grip sensor, a color sensor, an Ili sensor, a biosensor, a temperature sensor, a humidity sensor, and an illuminance sensor.

The camera modules 305 and 312 may include a first camera module 305 (e.g., the punch hole camera module) exposed to the first surface 310A of the electronic device 300 and a second camera module 312 and/or a flash 313 exposed to the second surface 310B.

The first camera module 305 may be exposed through a portion of the screen display area 310D of the first surface 310A. The first camera module 305 may be exposed to a partial area of the screen display area 310D through an opening defined in a portion of the display 301.

The second camera module 312 may include a plurality of camera modules (e.g., a dual camera or a triple camera). However, the second camera module 312 is not necessarily limited as including the plurality of camera modules and thus may include one camera module.

The camera modules 305 and 312 may include one or more lenses, an image sensor, and/or an image signal processor. The flash 313 may include an LED or a xenon lamp. Two or more lenses (the IR camera, the wide-angle lens, and the telephoto lens) and image sensors may be disposed on one surface of the electronic device 300.

The key input device 317 may be disposed on the side surface 310C of the housing 310. Alternatively, the electronic device 300 may not include some or all of the above-described key input devices 317, and the key input device 317 that is not included may be implemented in a different form on the display 301, like a soft key. The key input device may include a sensor module (e.g., the fourth sensor module 390) that defines the sensing area. 310F included in the screen display areas 310A and 310D.

The light emitting element 306 may be disposed on the first surface 310A of the housing 310. The light emitting element 306 may provide state information of the electronic device 300 in the form of light. The light emitting element 306 may provide a light source that is interlocked with an operation of the first camera module 305. The light emitting element 306 may include an LED, an IR LED, and/or a xenon lamp.

The connector holes 308 and 309 may include a first connector hole 308 that is capable of accommodating a connector (e.g., a USB connector) for transmitting and receiving power and/or data to and from an external electronic device and/or a second connector hole 309 (e.g., an earphone jack) that is capable of accommodating a connector for transmitting and receiving audio signal to and from the external electronic device.

Referring to FIG. 3C, the electronic device 300 includes a front plate 320, a display 330, a bracket 340, a first support member 342, a PCB 350, a battery 352, a rear case 360, an antenna 370, and a rear plate 380.

Alternatively, at least of the components one (e.g., the first support member 342 or the rear case 360) may be omitted, or other components may be added. At least one of the components of the electronic device 300 may be the same as or similar to at least one of the components of the electronic device 300 of FIG. 3A or 3B, and thus, repetitive descriptions thereof will be omitted below.

The first support member 342 may be disposed inside the electronic device 300 in order to be connected to the bracket 340 or may be integrated with the bracket 340. The first support member 342 may be made of a metal material and/or a non-metal (e.g., polymer) material. The first support member 342 may have one surface to which the display 330 is coupled and the other surface to which the printed circuit board 350 is coupled. A processor, a memory, and/or an interface may be mounted on the printed circuit board 350. The processor may include one or more of a CPU, an AP, a GPU, are ISP, a sensor hub processor, or a CP.

The memory may include a volatile memory or a non-volatile memory.

The interface may include an HDMI, a USB interface, an SD card interface, and/or an audio interface. The interface may electrically or physically connect the electronic device 300 to the external electronic device and may include a USB connector, an SD card/multimedia card (MMC) connector, or an audio connector.

The battery 352 may supplying power to at least one component of the electronic device and may include a non-rechargeable primary cell, a rechargeable secondary cell, or a fuel cell. At least a portion of the battery 352 may be disposed on substantially the same plane as the printed circuit board 350, The battery 352 may be integrally disposed inside the electronic device 300 or may be disposed to be detachable from the electronic device 300.

The antenna 370 may be disposed between the rear plate 380 and the battery 352. The antenna 370 may include a near field communication (NFC) antenna, a wireless charging antenna, and/or a magnetic secure transmission (MST) antenna. The antenna 370 may perform short-range communication with the external device or may wirelessly transmit/receive power for charging. An antenna structure may also be provided by a portion of the bracket 340 and/or the first support member 342 or a combination thereof.

The camera module 305 may be disposed inside the housing 310 so that the lens is exposed to the camera area 310E of the front surface 310A of the electronic device 300. The camera area 310G may be defined on the first plate 320. The camera module 305 may include a hole defined in the rear surface of the display 330 or a punch hole camera disposed inside a recess 337.

The camera module 312 may be disposed inside the housing 310 so that the lens is exposed to a camera area 310H of the rear surface 310B of the electronic device 300. The camera module 312 may be disposed on the printed circuit board 350.

Figure 4:
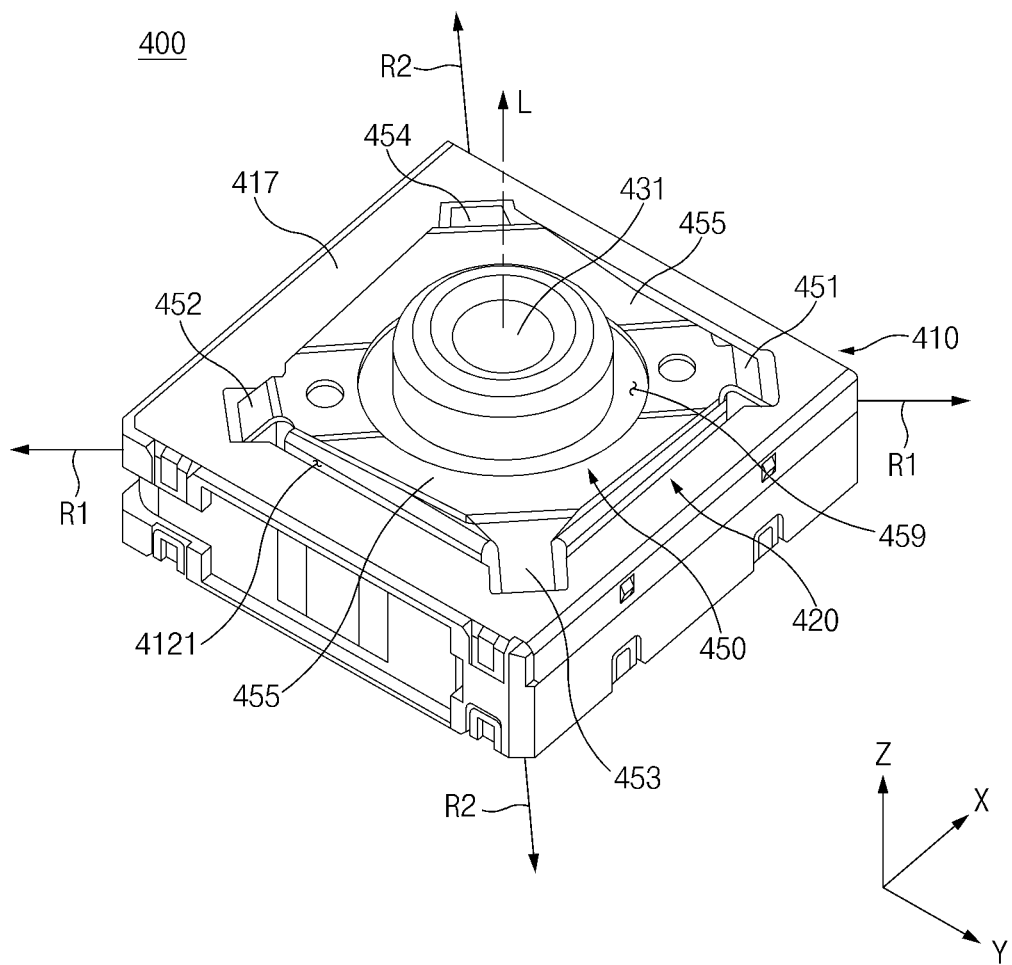
FIG. 4 illustrates a camera module according to an embodiment.

FIG. 4 illustrates a camera module according to an embodiment.

Referring to FIG. 4, a camera module 400 includes a first camera housing 410, a camera assembly 420 of which at least a portion is surrounded by the first camera housing 410, and a guide plate 450 connected to each of the first camera housing 410 and the camera assembly 420.

A first rotation axis R1 and a second rotation axis R2, which are substantially perpendicular to an optical axis L of a lens 431, are defined. The first rotation axis R1 and the second rotation axis R2 may be substantially perpendicular to each other.

At least a portion of the camera assembly 420 may be disposed inside the first camera housing 410. The first camera housing 410 includes a first cover 417 that is substantially directed in the Z-axis direction. An opening region 4121 may be defined in the first cover 417. At least a portion of the camera assembly 420 may be disposed in the opening region 4121 of the first cover 417.

The guide plate 450 includes a central portion 455 including an opening region 459, a first portion 451 and a second portion 452, which extend from the central portion 455 in the direction of the first rotation axis R1, and a third portion 453 and a fourth portion 454, which extend from the central portion 45 in the direction of the second rotation axis R2. The first portion 451 and the second portion 452 may be connected to the camera assembly 420, and the third portion 453 and the fourth portion 454 may be connected to the first camera housing 410.

The camera assembly 420 may be configured to be rotatable about each of the first rotation axis R1 and/or the second rotation axis R2. For example, the camera assembly 420 may rotate relative to the first camera housing 410. Accordingly, the camera module 400 may perform an image stabilization function. The camera module 400 may perform a shake compensation function (e.g., an image stabilization function) by rotating the camera assembly 420 with respect to a first rotation axis R1 and/or a second rotation axis R2. The first rotation axis R1 may be substantially perpendicular to the optical axis L of the lens 431 and may extend to cross the optical axis L of the lens 431 at any one point. The second rotation axis R2 may be substantially perpendicular to the optical axis L of the lens 431 and may extend to cross the optical axis L of the lens 431 at any one point. The first rotation axis R1 and the second rotation axis R2 may meet each other at a point through which the optical axis L of the lens 431 passes. The one point may be defined as a rotation center point of the camera assembly 420.

The camera assembly 420 may rotate about each of the first rotation axis R1 and/or the second rotation axis R2 so that the optical axis L of the lens 4311 has a predetermined range (e.g., a moving range) with respect to a Z-axis.

Figure 5:
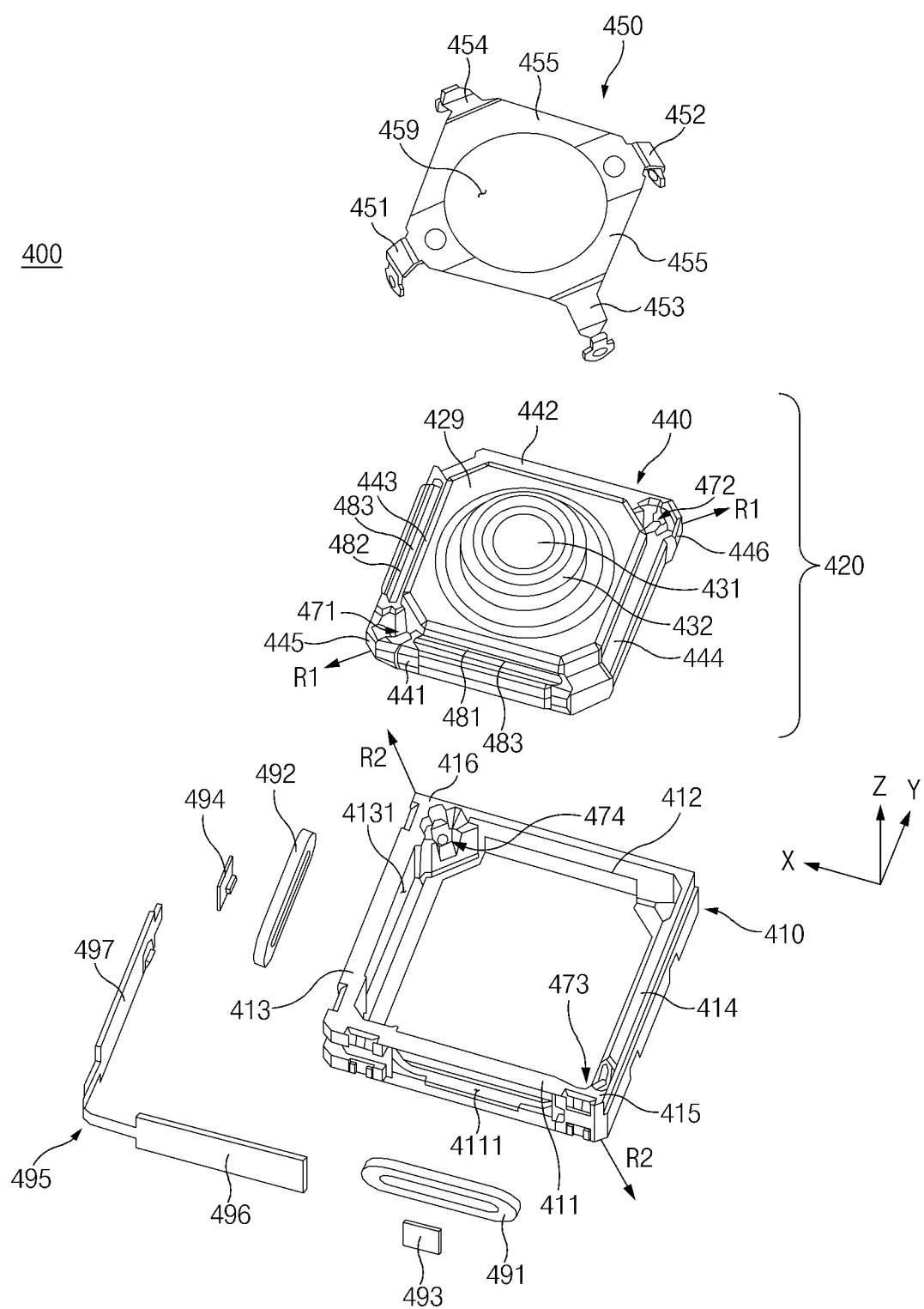
FIG. 5 illustrates an exploded perspective view of a camera module according to an embodiment.

FIG. 5 illustrates an exploded perspective view of a camera module according to an embodiment.

Referring to FIG. 5, the camera module 400 includes a first camera housing 410, a camera assembly 420, and a guide plate 450.

The camera module 100 includes frame structures 411, 412, 413, and 414 of the first camera housing 410, a third support structure 473 and a fourth support structure 474, which are connected to the guide plate 450, and coils 491 and 492, In an embodiment, the frame structures 411, 112, 413, and 414 may define a space in which the camera assembly 420 is disposed.

The frame structures 411, 412, 413, and 414 include a first frame structure 411 and a second frame structure 412, which face each other, and a third frame structure 413 and a fourth frame structure, which face each other. The first frame structure 411 and the second frame structure 412 may be connected by the third frame structure 413 and the fourth frame structure 414, respectively. Each of the first frame structure 411 and the second frame structure 412 may extend in an X-axis direction. Each of the third frame structure 413 and the fourth frame structure 414 may extend in a Y-axis direction. The first frame structure 411 may be disposed in a −Y-axis direction from the second frame structure 412. The third frame structure 413 may be disposed in a +X-axis direction from the fourth frame structure 414.

A first coil 491 and a first sensor 493 are disposed on the first frame structure 411. A first opening region 4111 in which the first coil 491 is disposed may be defined in the first frame structure 111. The first coil 491 may be disposed to substantially face a first magnetic body 481 included in the camera assembly 420. The first sensor 493 may be disposed adjacent to the first magnetic body 481 to sense a position of the first magnetic body 481. The first sensor 493 may sense a rotation angle of the camera assembly 420. The first sensor 493 may be disposed in the first opening region 4111. The first sensor 493 may include a hall sensor.

A second coil 492 and a second sensor 494 are disposed on the third frame structure 413. For example, a second opening region 4:1.31 in which the second coil 492 is disposed is defined in the third frame structure 413. The second coil 492 may be disposed to substantially face a second magnetic body 482 included in the camera assembly 420. The second sensor 494 may be disposed adjacent to the second magnetic body 482 to sense a position of the second magnetic body 482. The second sensor 494 may sense a rotation angle of the camera assembly 420. The second sensor 494 may be disposed in the second opening region 4131. The second sensor 494 may include a hail sensor.

The first sensor 493 and/or the second sensor 494 may sense a rotation angle (e.g., a moving range) at which the camera assembly 420 moves with respect to the rotation axes R1 and R2, The electronic device may perform a shake compensation function (e.g., image stabilization function) of the camera module 400 based on the rotation angle that is identified using the first sensor 493 and/or the second sensor 494.

The third support structure 473 may be disposed at a third corner portion 415 defined lay the first frame structure 411 and the fourth frame structure 414. The fourth support structure 474 may be disposed at a fourth corner portion 416 defined by the second frame structure 412 and the third frame structure 413. The third corner portion 415 may be disposed at a portion at which the first frame structure 411 and the fourth frame structure 414 are connected to each other. The fourth corner portion 416 may be disposed at a portion at which the second frame structure 412 and the third frame structure 413 are connected to each other. The third corner portion 415 and the fourth corner portion 416 may substantially face each other in a direction of the second rotation axis R2.

The positions of the third support structure 473 and/or the fourth support structure 474 are not limited to the illustrated embodiment, and according to various embodiments, the positions of the third support structure 473 and/or the fourth support structure 474 may be changed with each other. The third support structure 473 and the fourth support structure 474 are illustrated to substantially face each other in the direction of the second rotation axis R2, but as another example, the third support structure 473 and the fourth support structure 474 may be disposed to face each other in the direction of the first rotation axis R1. The third support structure 473 may be disposed at a corner portion defined by the first frame structure 411 and the third frame structure 413, and the fourth support structure 474 may be disposed at a corner portion defined by the second frame structure 412 and the fourth frame structure 414.

A third portion 453 of the guide plate 450 may be coupled to the third support structure 473 so that the guide plate 450 is rotatable about the second rotation axis R2. The third support structure 473 may be coupled to the guide plate 450 in a direction of the second rotation axis R2, which is substantially perpendicular to the first rotation axis R1 so that the guide plate 450 is fixed when the camera assembly 420 rotates about the first rotation axis R1.

A fourth portion 454 of the guide plate 450 may be coupled to the fourth support structure 474 so that the guide plate 450 is rotatable about the second rotation axis R2. The fourth support structure 474 may be coupled to the guide plate 450 in the direction of the second rotation axis R2, which is substantially perpendicular to the first rotation axis R1 so that the guide plate 450 is fixed when the camera assembly 420 rotates about the first rotation axis R1.

The camera module 400 includes a connection member 495 surrounding at least a portion of the first camera housing 410. The connection member 495 includes a first area 496 on which the first coil 491 is disposed and a second area 497 on which the second coil 492 is disposed.

The connection member 495 may be coupled to the first camera housing 410 so that the first area is disposed on the first frame structure 41 and the second area 497 is disposed on the second frame structure 412. The first area 496 may be disposed on the first frame structure 411 so that the first coil 491 is aligned with the first opening region 4111. For example, the second area 497 may be disposed on the second frame structure 412 so that the second coil 492 is aligned with the second opening region 4131. The first sensor 493 may be disposed on the first area 496, and the second sensor 494 may be disposed on the second area 497. The connection member 495 may include a PCB or a flexible PCB (FPCB).

The camera assembly 420 includes a second camera housing 429 in which a lens 431, a lens barrel 432, and an image sensor are disposed, a holder 440 surrounding the second camera housing 429, and a first support structure 471 and a second support structure 472, which are connected to the guide plate 450.

The lens 431 protruding in the optical axis direction (e.g., the Z-axis direction) and the lens band 432 surrounding the lens 431 may be disposed in the second camera housing 429. The image sensor disposed in the optical axis direction (e.g., the Z-axis direction) from the lens 431 may be disposed inside the second camera housing 429. The image sensor may be configured to convert light incident from the lens 431 into an electrical signal.

The holder 440 includes a first sidewall 441 and a second sidewall 442, which face each other, and a third sidewall 443 and a fourth sidewall 444, which face each other. The first sidewall 441 and the second sidewall 442 may be connected by the third sidewall 443 and the fourth sidewall 444, respectively. Each of the first sidewall 441 and the second sidewall 442 may extend in the X-axis direction, and each of the third sidewall 443 and the fourth sidewall 444 may extend in the Y-axis direction. The first sidewall 441 may be disposed in the −Y-axis direction from the second sidewall 442, and the third sidewall 443 may be disposed in the +X-axis direction from the fourth sidewall 444.

The holder 440 may face the frame structures 411, 412, 413, and 414 of the first camera housing 410. The first sidewall 441 may face the first frame structure 411 of the first camera housing 410, The second sidewall 442 may face the second frame structure 412 of the first camera housing 410. The third sidewall 443 may face the third frame structure 413 of the first camera housing 410. The fourth sidewall 444 may face the fourth frame structure 414 of the first camera housing 410.

The camera assembly 420 includes a first magnetic body 481, a second magnetic body 482, and a yoke member 483. The first magnetic body 481 may be disposed on the first sidewall 441 to substantially face the first coil 491. The first magnetic body 481 may be disposed adjacent to the first sensor 493. The second magnetic body 482 may be disposed on the third sidewall 443 to substantially face the second coil 492, The second magnetic body 482 may be disposed adjacent to the second sensor 494.

The yoke member 483 may be disposed between the first sidewall 441 and the first magnetic body 481 and between the second sidewall 442 and the second magnetic body 482. The yoke member 483 may be made of a magnetic body and be disposed between the second camera housing 429 and the magnetic bodies 481 and 482 so that magnetic fields generated from the first magnetic body 481 and the second magnetic body 482 do not pass through the camera assembly 420.

The first support structure 471 may be disposed at the first corner portion 445 defined by the first sidewall 441 and the third sidewall 443. The second support structure 472 may be disposed at the second corner portion 446 defined by the second sidewall 442 and the fourth sidewall 444. The first corner portion 445 may be disposed at a portion at which the first sidewall 441 and the third sidewall 443 are connected to each other, and the second corner portion 446 may be disposed at a portion at which the second sidewall 442 and the fourth sidewall 444 are connected to each other. The first corner portion 445 and the second corner portion 446 may substantially face each other in the direction of the first rotation axis R1.

The positions of the first support structure 471 and/or the second support structure 472 are not limited to the illustrated embodiment, and the positions of the first support structure 471 and/or the second support structure 472 may be changed with each other according to various embodiments. For example, the first support structure 471 and the second support structure 472 are illustrated to substantially face each other in the direction of the first rotation axis R1, but the first support structure 471 and the second support structure 472 may be disposed to face each other in the direction of the second rotation axis R2. The first support structure 471 may be disposed at a corner portion defined by the first sidewall 441 and the fourth sidewall 444, and the second support structure 472 may be disposed at a corner portion defined by the second sidewall 442 and the third sidewall 443.

The first portion 451 of the guide plate 450 may be connected to the first support structure 471. The first support structure 471 may be coupled to the guide plate 450 in the direction of the first rotation axis R1 so that the camera assembly 420 and the guide plate 450 rotate together when the camera assembly 420 rotates about the second rotation axis R2.

The second portion 452 of the guide plate 450 may be connected to the second support structure 472. The second support structure 472 may be coupled to the guide plate 450 in the direction of the first rotation axis R1 so that the camera assembly 420 and the guide plate 450 rotate together when the camera assembly 420 rotate about the second rotation axis R2.

The first coil 491 and the second coil 492 are not necessarily limited as being disposed on one connecting member 495, For example, the first coil 491 and the second coil 492 may be disposed on separate connecting members 495, respectively.

Further, the first coil 491 and the second coil 492 are not limited to the positions illustrated in the drawings, and the first coil 491 may be disposed, for example, on any one of the frame structures (e.g., the first frame structure 411 and the second frame structure 412) extending in the X-axis direction, and the second coil 492 may be disposed on any one of the frame structures (e.g., the third frame structure 413 and the fourth frame structure 414) extending in the Y-axis direction.

The first coil 491 and the second coil 492 may be disposed on the camera assembly 420, and the first magnetic body 481 and the second magnetic body 482 may be disposed in the first camera housing 410 in order to substantially face the first coil 491 and the second coil 492, respectively.

The guide plate 450 includes a central portion 455 including an opening region 459, a first portion 451 and a second portion 452, which extend from the central portion 455 in the direction of the first rotation axis R1, and a third portion 453 and a fourth portion 454, which extend in the direction of the second rotation axis R2.

The guide plate 450 may be provided as a substantially rectangular plate in which the opening region 459 is defined in the central portion 455 and may include a first portion 451 and a second portion 452, which extend from a vertex portion of the rectangular plate in the direction of the first rotation axis R1, and a third portion 453 and a fourth portion 454, which extend in the direction of the second rotation axis R2.

In the guide plate 450, the first portion 451 may be coupled to the first support structure 471 of the camera assembly 420, and the second portion 452 may be coupled to the second support structure 472 of the camera assembly 420. In the guide plate 450, the third portion 453 may be coupled to the third support structure 473 of the first camera housing 410, and the fourth portion 454 may be coupled to the fourth support structure 474 of the first camera housing 4:1.0.

When the camera assembly 420 rotates about the first rotation axis R1, the guide plate 450 may be fixed to the first camera housing 410 by the third support structure 473 and the fourth support structure 474. A distance between each of the third portion 453 and the fourth portion 454 of the guide plate 450 and the camera assembly 420 may be changed. For example, the third portion 453 of the guide plate 450 may be closer to the camera assembly 420, and the fourth portion 454 of the guide plate 450 may be away from the camera assembly 420. The guide plate 450 may rotate about the second rotation axis R2 together with the camera assembly 420.

The structure of the guide plate 450 may change based on the camera assembly 420 and/or the first camera housing 410 connected to the guide plate 450. For example, if the first portion 451 and the second portion 452 are connected to the first camera housing 410, and the third portion 453 and the fourth portion 454 are connected to the camera assembly 420, a structure that is different from the structure of the guide plate 450 illustrated in FIG. 5 may be provided.

Figure 6A:
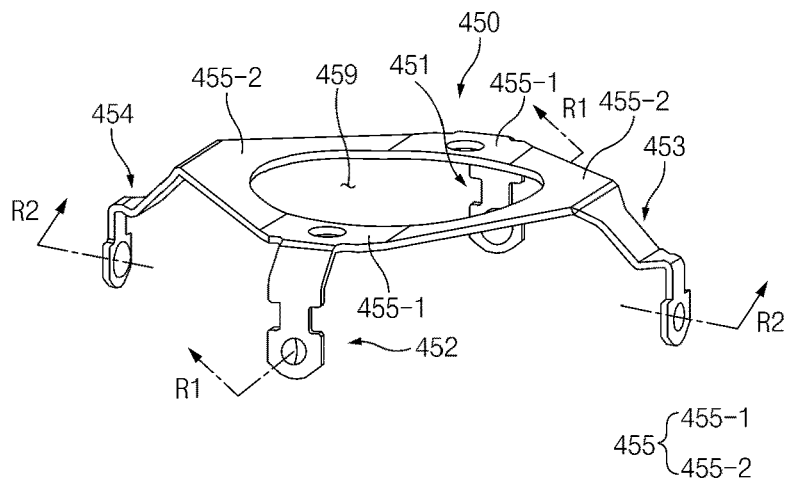
FIGS. 6A, 6B, and 6C illustrate a guide plate of a camera module according to an embodiment.
Figure 6B:
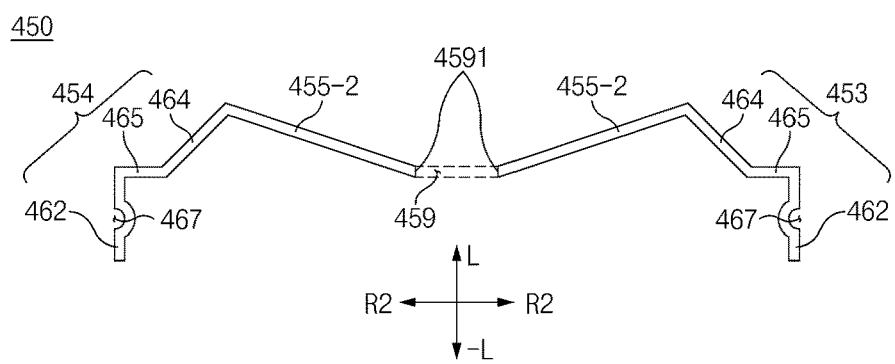
Figure 6C:
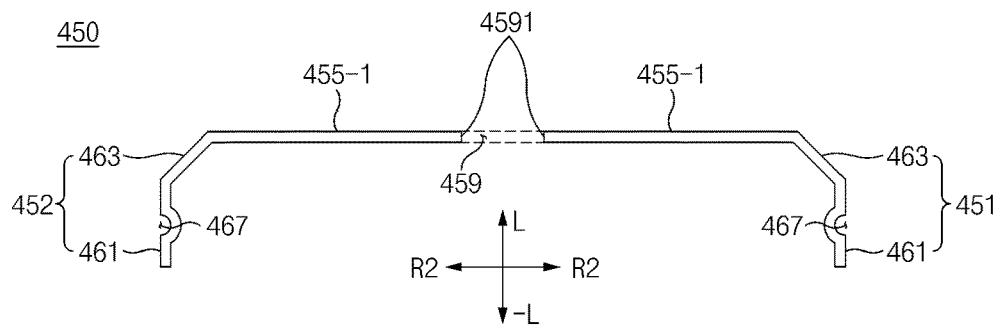

FIGS. 6A, 6B, and 6C illustrates a guide plate of a camera module according to an embodiment. More specifically, FIG. 6A illustrates a guide plate 450, FIG. 6B illustrates a cross-sectional view based on the second rotation axis R2, and FIG. 6C illustrates a cross-sectional view based on the first rotation axis R1.

Referring to FIGS. 6A to 6C, the central portion 455 of the guide plate 450 includes a first central portion 455-1 connected to each of the first portion 451 and the second portion 452 and a second central portion 455-2 connected to each of the third portion 453 and the fourth portion 454. Referring to FIG. 6C, the first central portion 455-1 include a plane substantially facing an optical axis direction L. Referring to FIG. 6B, the second central portion 455-2 includes a plane that is inclined upward in a substantially positive direction of the optical axis L of the lens 431 from a peripheral portion 4591 of the opening region 4591 toward the direction of the second rotation axis R2.

Referring to FIG. 6C, the first portion 451 and the second portion 452 include a first coupling portion 461 and a first extension portion 463 extending from the first central portion 455-1 to the first coupling portion 461. The first extension portion 463 extend to be inclined downward in a negative direction −L of the optical axis from the first central portion 455-1 toward the direction of the first rotation axis R1. The first coupling portion 461 includes a plane substantially facing the first rotation axis R1.

An accommodation portion 457 into which a protruding portion disposed on each of the first support structure and the second support structure is accommodated may be defined in the first coupling portion 461. The accommodation portion 467 may have a shape that substantially corresponds to a shape of a portion of a sphere.

The third portion 453 and the fourth portion 454 may include a second coupling portion 462, a second extension portion 464 extending from the second central portion 455-2, and a third extension portion 465 extending from the second extension portion 464 to the second coupling portion 462. The second extension portion 464 may extend to be inclined downward from the second central portion 455-2 toward the negative direction L of the optical axis. The third extension portion 465 may include a plane substantially facing the optical axis direction L of the lens 431. The second coupling portion 462 may include a plane substantially facing the second rotation axis R2.

An accommodation portion 467 into which a protruding portion disposed on each of the third support structure and the fourth support structure is accommodated may be defined in the second coupling portion 462. The accommodation portion 467 may have a shape that substantially corresponds to a shape of a portion of a sphere.

The accommodation portion 467 may be disposed in an outer surface of each of the first coupling portion 461 and the second coupling portion 462. An inner surfaces of each of the coupling portions 461 and 462 may be a surface substantially facing the optical axis L of the lens 431, and an outer surface may be a surface facing the inner surface.

The accommodation portion 467 defined in each of the first portion 451, the second portion 452, the third portion 453, and the fourth portion 454 may have the same or similar height if viewed in the optical axis direction L of the lens 431. Thus, the first rotation axis R1 may be defined as a virtual line connecting the accommodation portion 467 of the first portion 451 to the accommodation portion 467 of the second portion 452, which substantially face each other. The second rotation axis R2 may be defined as a virtual line connecting the accommodation portion 467 of the third portion 453 to the accommodation portion 467 of the fourth portion 454, which substantially face each other. Thus, the first rotation axis R1 and the second rotation axis R2 may cross each other at a rotation center point, and the rotation center point may be disposed on the optical axis of the lens 431.

Figure 7:
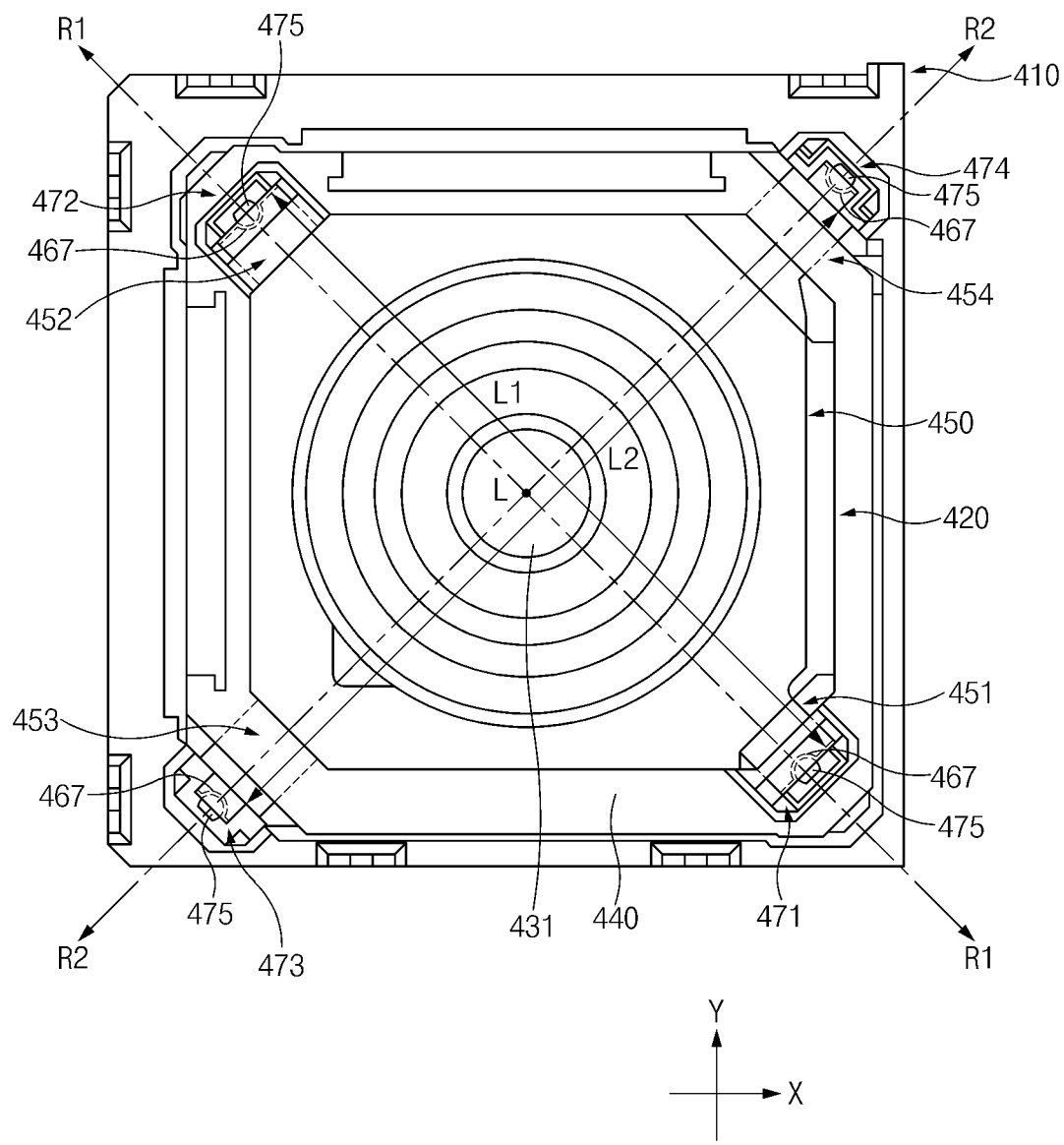
FIG. 7 illustrates a camera module according to an embodiment.

FIG. 7 illustrates a camera module according to an embodiment.

Referring to FIG. 7, when the camera assembly 420 is viewed in the optical axis direction of the lens 431, the guide plate 450 may be coupled to the camera assembly 420 and the first camera housing 410 so that at least portion of the central portion overlaps the camera assembly 420, and the lens is exposed through an opening region. The first portion 451 and the second portion 452 of the guide plate 450 may be coupled to the first support structure 471 and the second support structure 472, which are disposed on the holder of the camera assembly 420, respectively. The third portion 453 and the fourth portion 454 of the guide plate 450 may be coupled to the third support structure 473 and the fourth support structure 474, which are disposed in the first camera housing 410, respectively.

Each of the first support structure 471 and the second support structure 472 may include a protruding portion 475 that substantially protrudes toward the camera assembly 420. The protruding portion 475 may protrude toward a cross point of the first rotation axis R1 and the second rotation axis R2. The protruding portion 475 may have a shape corresponding to the accommodation portion 467 defined in each of the first portion 451 and the second portion 452 of the guide plate 450.

Each of the third support structure 473 and the fourth support structure 474 may include a protruding portion 475 that substantially protrudes toward the camera assembly 420. The protruding portion 475 may protrude toward a cross point of the first rotation axis R1 and the second rotation axis R2. The protruding portion 475 may have a shape corresponding to the accommodation portion 467 defined in each of the third portion 453 and the fourth portion 454 of the guide plate 450.

The protruding portion disposed on each of the first support structure 471 and the second support structure 472 of the camera assembly 420 may be coupled to the accommodation portion 467 defined in each of the first portion 451 and the second portion 452 of the guide plate 450 to define the first rotation axis R1. The protruding portion 475 disposed on each of the third support structure 473 and the fourth support structure 474 of the first camera housing 410 may be coupled to the accommodation portion 467 defined in each of the third portion 453 and the fourth portion 454 of the guide plate to define the second rotation axis R2.

The protruding portions 475 respectively disposed on the first support structure 471, the second support structure 472, the third support structure 473, and the fourth support structure 474 may have the same or similar height. The height may be a distance measured in the direction of the optical axis L of the lens 431. Thus, a rotation center point at which the first rotation axis R1 and the second rotation axis R2 cross each other may be defined at the camera module 400. The rotation center point may be disposed at the optical axis L of the lens 431.

The first support structure 471 and the second support structure 472 may be spaced a first distance L1 from each other in the direction of the first rotation axis R1. The third support structure 473 and the fourth support structure 474 may be spaced a second distance L2 from each other in the direction of the second rotation axis R2 The first distance L1 may be less than the second distance L2.

The positions of the accommodation portion 467 and the protruding portion 475 are not limited to those illustrated in FIG. 7, and the positions of the accommodation portion 467 and the protruding portion 475 may be changed accordingly. For example, the accommodation portion 467 may be defined in each of the first support structure 471, the second support structure 472, the third support structure 473, and the fourth support structure 474, and the protruding portion 475 may be disposed on each of the first portion 451, the second portion 452, the third portion 453, and the fourth portion 454 of the guide plate 450. The protruding portion 475 may protrude in a direction away from the optical axis L of the lens 431. The protruding portion 475 included in the first portion 451 and the second portion 452 may protrude in a direction that is away from the lens 431 as the direction of the first rotation axis. The protruding portion 475 included in the third portion 453 and the fourth portion 454 may protrude in a direction that is away from the lens 431 as the direction of the second rotation axis. In addition, the accommodation portion 467 may be disposed on each of the first portion 451 of the guide plate 450, the second portion 452 of the guide plate 450, the third support structure 473, and the fourth support structure 474, and thus, the protruding portions may be coupled to the first support structure 471 the second support structure 472 the third portion 453 of the guide plate 450, and the fourth portion 454 of the guide plate 450, respectively. Other various arrangements are also possible.

Figure 8:
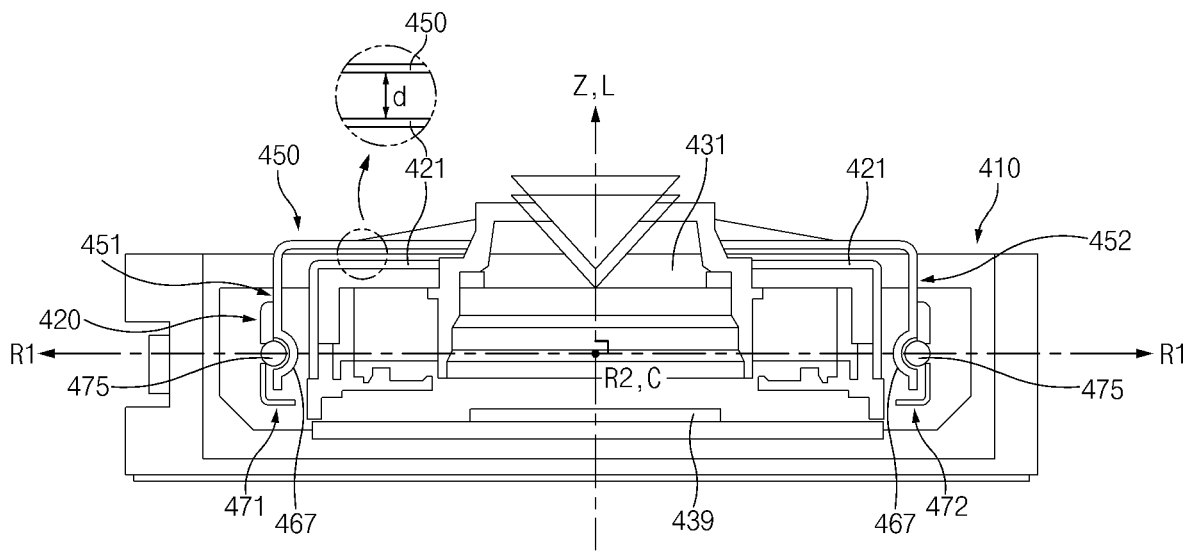
FIG. 8 illustrates a second rotation driving of a camera module according to an embodiment.
Figure 8:
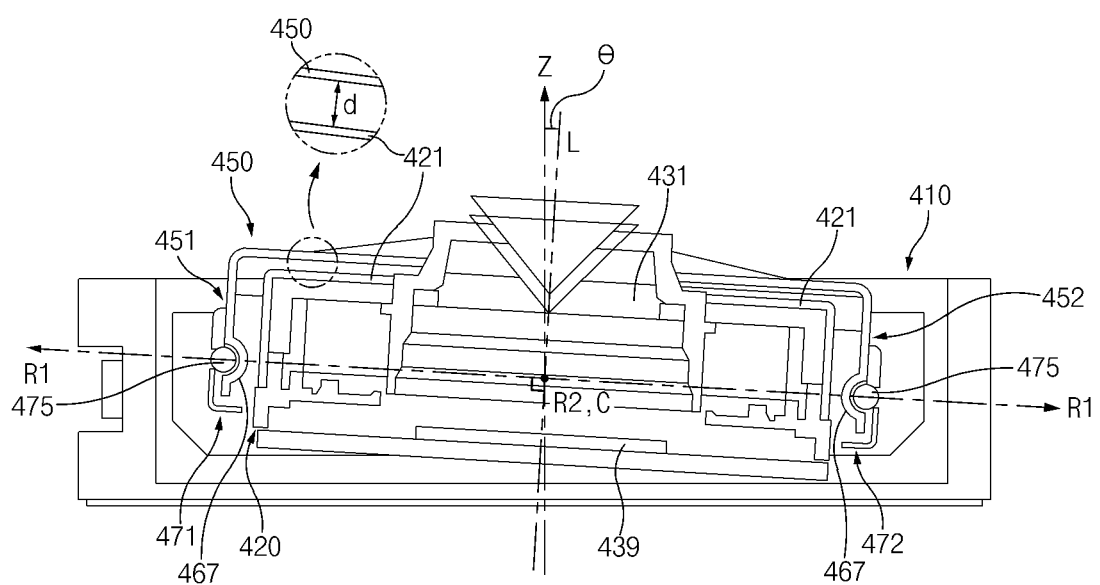
Figure 9:
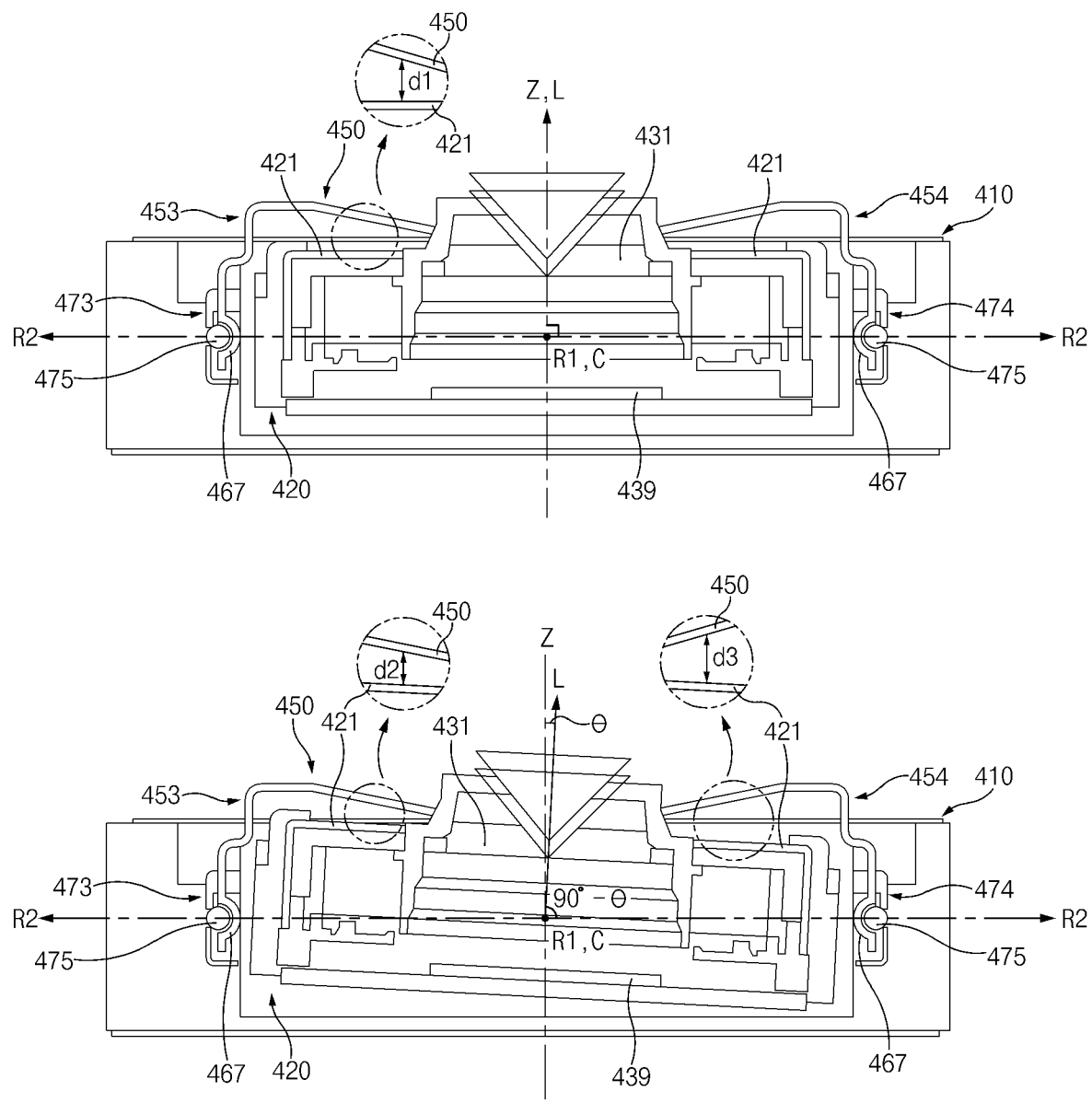
FIG. 9 illustrates a first rotation driving of the camera module according to an embodiment.

FIG. 8 illustrates a second rotation driving of a camera module according to an embodiment. FIG. 9 illustrates a first rotation driving of a camera module according to an embodiment.

As illustrated in FIGS. 8 and 9, the camera module 400 may perform first rotation driving that rotates about the first rotation axis R1 and second rotation driving that rotates about the second rotation axis R2. The camera module 400 may simultaneously or sequentially perform the first rotation driving and the second rotation driving. The camera module 400 simultaneously performing the first rotation driving and the second rotation driving may be understood as the camera assembly 420 rotating about a rotation center point.

Referring to FIG. 8, the camera module 400 includes a first camera housing 410 including the third support structure 473 and the fourth support structure 474, a camera assembly 420 including the lens 431, the image sensor 439 the first support structure 471, and the second support structure 472, and a guide plate 450 coupled to the first support structure 471, the second support structure 472, the third support structure 473, and the fourth support structure 474. The guide plate 450 includes a first portion 451, a second portion 452, a third portion 453, and a fourth portion 454, which are coupled to the support structures 471, 472, 473, and 474, respectively. A protruding portion 475 may be disposed on each of the support structures 471, 472, 473, and 474, and an accommodation portion 467 into which the protruding portion 475 is accommodated may be defined in each of the portions 451, 452, 453, and 454 of the guide plate 450.

The camera assembly 420 may rotate about the second rotation axis R2. In the second rotation driving, the camera assembly 420 may rotate together with the guide plate 450. At least a portion of the first portion 451 of the guide plate 450 may protrude toward a top surface 421 of the first camera housing 410. In addition, at least a portion of the second portion 452 of the guide plate 450 may protrude toward the top surface 421 of the first camera housing 410.

In the second rotation drive, the first rotation axis R1 may extend substantially perpendicular to the optical axis L of the lens 431. For example, in the basic state, the second rotation axis R2 may be substantially perpendicular (e.g., 90 degrees) to the optical axis L of the lens 431, and the first rotation axis R1 and the optical axis L of the lens 431 may be maintained at 90 degrees.

When the second rotation driving is performed, the optical axis L of the lens 431 may be spaced a predetermined angle θ from the Z-axis direction. The Z-axis may be the optical axis L of the lens 431 in a state in which the camera assembly 420 does not rotate. The angle θ may be greater than or equal to 0 degrees and less than 10 degrees.

When the camera assembly 420 rotates about the second rotation axis R2, a distance d between the guide plate 450 and the camera assembly 420 may be substantially uniform.

Referring to FIG. 9, the camera assembly 420 may rotate about the first rotation axis R1. In the first rotation driving, the camera assembly 420 may rotate relative to the guide plate 450. The guide plate 450 may be fixed to the first camera housing 410, and only the camera assembly 420 may rotate about the first rotation axis R1. The guide plate 450 may be maintained in substantially the same state regardless of the rotation of the camera assembly 420.

In the first rotation driving, the second rotation axis R2 may have a predetermined angle with respect to the optical axis L of the lens 431 except for 90 degrees. For example, the first rotation axis R1 and the optical axis L of the lens 431 may be substantially perpendicular (e.g., 90 degrees) to each other, and as the first rotation driving is performed, the second rotation axis R2 and the optical axis L of the lens 431 may be angled at an angle (e.g., 90−θ) other than 90 degrees. The optical axis L of the lens 431 may be spaced a predetermined angle θ from the Z-axis direction. The Z-axis may be the optical axis L of the lens 431 in a state in which the camera assembly 420 does not rotate. The angle θ may be greater than or equal to 0 degrees and less than 10 degrees.

When the camera assembly 420 rotates about the first rotation axis R1, distances d1, d2, and d3 between the guide plate 450 and the camera assembly 420 may vary. For example, while the camera assembly 420 does not rotate, the guide plate 450 and the camera assembly 420 may have the first distance d1 therebetween. While the camera assembly 420 rotates, the guide plate 450 and the camera assembly 420 may have the second distance d2 and the third distance d3 different from the first distance d1 therebetween. The third portion 453 of the guide plate 450 is spaced the second distance d2 from the camera assembly 420, and the fourth portion 454 of the guide plate 450 may be spaced the third distance d3 greater than the second distance d2 from the camera assembly 420. For example, in the guide plate 450, a left side portion based on the optical axis L of the lens 431 may have the second distance d2, and a right side portion may have the third distance d3 greater than the second distance d2. The second distance d2 may be less than the first distance d1, and the third distance d3 may be larger than the first distance d1.

The camera assembly 420 may rotate together with the lens 431 and the image sensor 439. That is, if the camera assembly 420 rotates, relative positions of the lens 431 and the image sensor 439 may be maintained. Therefore, if the image stabilization function is performed, a focus of an image may be maintained.

Figure 10:
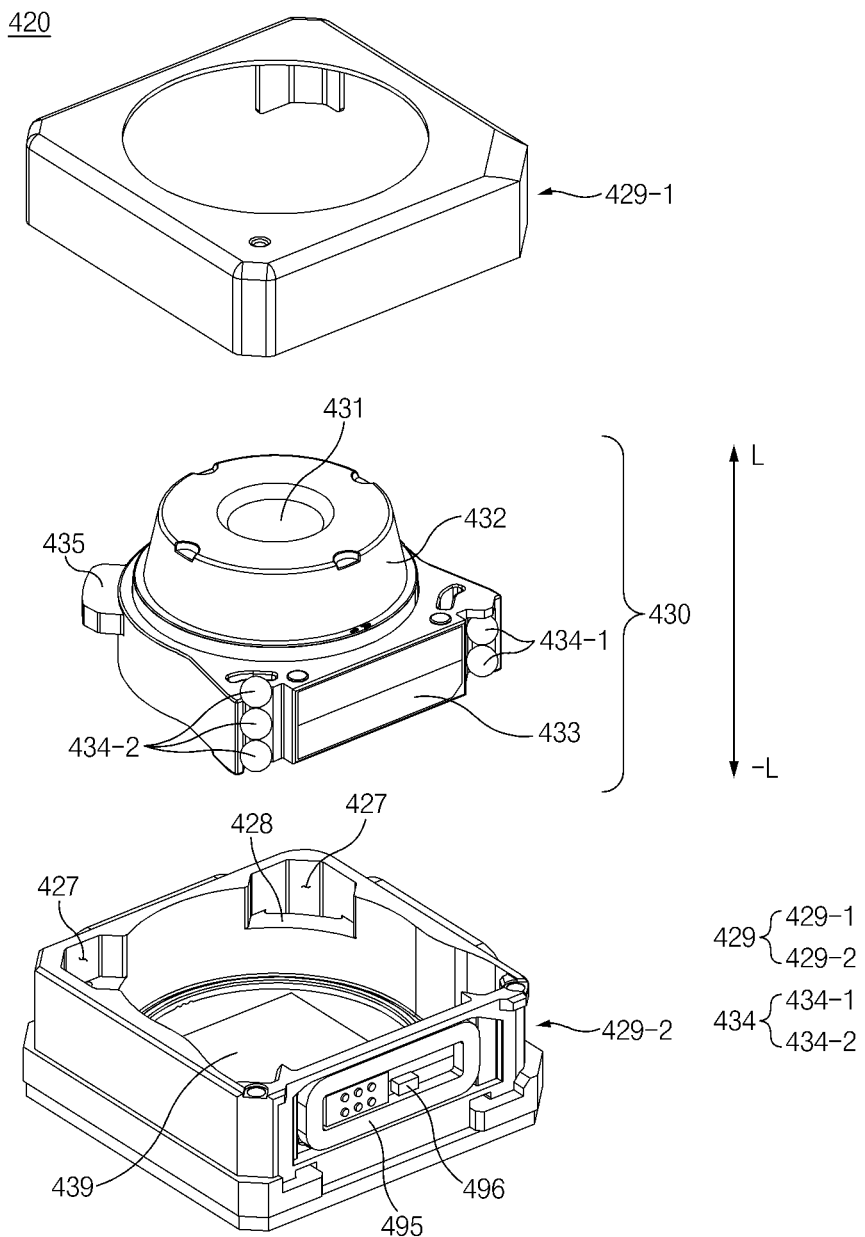
FIG. 10 illustrates an exploded perspective view of a camera assembly of a camera module according to an embodiment.

FIG. 10 illustrates an exploded perspective view of a camera assembly of a camera module according to an embodiment.

Referring to FIG. 10, the camera assembly 420 includes a lens carrier 430, a second camera housing 429, a third magnetic body 433, a third coil 495, a third sensor 496, and a plurality of balls 434.

The second camera housing 429 may define an inner space in which the lens carrier 430 is accommodated. The second camera housing 429 includes an upper housing 429-1 and a lower housing 429-2. The upper housing 429-1 has an opening. An image sensor 439 may be disposed in the lower housing 429-2. The opening may be aligned with an opening region of the guide plate. The opening may be aligned with the lens 431, The lens barrel 432 may protrude to the outside of the second camera housing 429 through the opening.

The lens carrier 430 includes the lens barrel 432. The lens barrel 432 includes one or more lenses 431 therein. The lens barrel 432 may be disposed to surround the lens 431. The lens carrier 430 may move (e.g., a L/−L direction) based on the optical axis L of the lens 431 in a space between the upper housing 429-1 and the lower housing 429-2, The camera module 400 may provide an auto focusing function by allowing the lens 431 together with the lens carrier 430 to move (e.g., the L/−L direction) based on the direction of the optical axis L. The camera module 400 may provide the auto focusing function by allowing the lens 431 to move in a direction that is substantially parallel to the optical axis L of the lens 431.

The camera assembly 420 includes a third magnetic body 433 and a third coil 495 in order to allow the lens carrier 430 to move (the L/−L direction) based on the optical axis L of the lens 431. The third magnetic body 433 may be disposed on a side surface of the lens carrier 430, and the third coil 495 may be disposed in the upper housing 429-1 or the lower housing 429-2 to substantially face the third magnetic body 433. The third magnetic body 433 and the third coil 495 may electromagnetically interact with each other.

The camera assembly 420 further includes a third sensor 496 configured to sense a position of the third magnetic body 433. The third sensor 496 may be disposed in the upper housing 429-1 or the lower housing 429-2. The third sensor 496 may sense a displacement of the lens carrier 430 through the position of the third magnetic body 433 that moves together with the lens carrier 430. The third sensor 496 may include a hall sensor that senses magnetic force of the third magnetic body 433. The camera module 400 may measure the position of the lens carrier 430 based on a signal sensed by the third sensor 496.

The third sensor 496 may sense displacements of the lens carrier 430 and/or the third magnetic body 433, and the electronic device may provide an auto focusing function using the third magnetic body 433 and the third coil 495, Because the lens 431 moves with the lens carrier 430 in the direction of the optical axis L (e.g., the L/−L direction), a distance from the image sensor 439 disposed in the second camera housing 429 (e.g., the lower housing 429-2) may vary. As described above, the electronic device may adjust a focal length by moving the lens carrier 430 according to a distance of a component.

The camera assembly 420 includes the plurality of balls 434 disposed between the side surface of the lens carrier 430 and the second camera housing 429. The plurality of balls 434 may provide rolling friction force between the lens carrier 430 and the second camera housing 429 if the lens carrier 430 moves in the direction of the optical axis L. The plurality of balls 434 include a plurality of first balls 434-1 disposed at one side of the third magnetic body 433 and a plurality of second balls 434-2 disposed on the other side of the third magnetic body 433, The plurality of first balls 4344 and the plurality of second balls 434-2 may be arranged in the direction of the optical axis L of the lens 431.

The camera assembly 420 includes a guide member 435 and a guide rail 427 in which the guide member 435 is accommodated in order to guide the movement of the lens carrier 430 in the direction of the optical axis L. The guide member 435 may protrude from the side surface of the lens carrier 430, and the guide rail 427 may be disposed in the upper housing 429-1 or the lower housing 429-2 in order to accommodate the guide member 435. The guide rail 427 may be disposed in the lower housing 429-2. The guide member 435 may be accommodated in the guide rail 427 in order to guide the lens carrier 430 to move (e.g., the L/–L direction) with respect to the optical axis L.

The guide rail 427 may extend to be opened upward from a stepped surface 428 disposed in the lower housing 429-2. If the lens carrier 430 moves downward, the stepped surface 428 may support the guide member 435 to limit a movement range of the lens carrier 430 in the downward direction (e.g., a –L direction).

Figure 11:
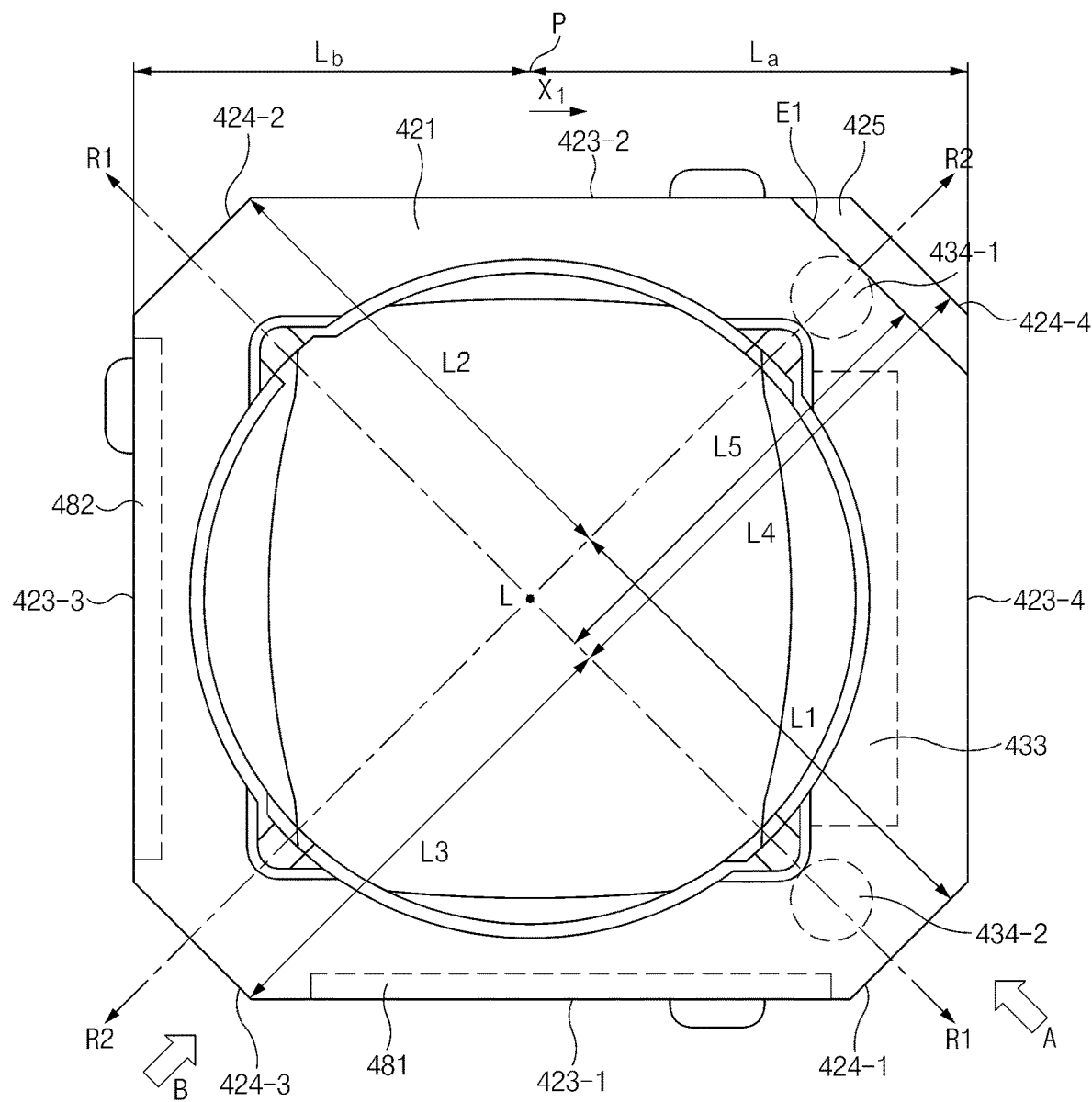
FIG. 11 illustrates a camera assembly of a camera module according to an embodiment.

FIG. 11 illustrates a camera assembly of a camera module according to an embodiment. Specifically, the camera assembly illustrated in FIG. 11 omits the lens carrier illustrated in FIG. 10.

Referring to FIG. 11, the camera assembly 420 includes a top surface 421 substantially facing the optical axis L of the lens 431 and a side surface 423 facing a direction that is substantially perpendicular to the optical axis L of the lens 431. The side surface 423 may include a plane having a normal vector (e.g., an X-axis and a Y-axis) that is perpendicular to the optical axis L.

The side surface 423 of the camera assembly 420 includes a first side area 423-1, a second side area 423-2 facing the first side area 423-1, a third side area 423-3 disposed between the first side area 423-1 and the second side area 423-2, and a fourth side area 423-4 facing the third side area 423-3. The first side area 423-1 may include a plane substantially facing the –Y axis direction. The second side area 423-2 may include a plane substantially facing the +Y axis direction. The third side area 423-3 may include a plane substantially facing the –X axis direction. The fourth side area 423-4 may include a plane substantially facing the +X-axis direction.

The side surface 424 of the camera assembly 420 includes a first corner area 424-1, a second corner area 424-2 substantially facing the first corner area 424-1 in the direction of the first rotation axis, a third corner area 424-3, and a fourth corner area 424-4 substantially facing the third corner area 424-3 in the direction of the second rotation axis. The first corner area 424-1 is disposed between the first side area 4234 and the fourth side area 423-4, the second corner area 424-2 is disposed between the second side area 423-2 and the third side area 423-3, the third corner area 424-3 is disposed between the first side area 423-1 and the third side area 423-3, and the fourth corner area 424-4 is disposed between the first side area 4234 and the second side area 423-2.

The third corner area 424-3 may substantially face a third opposing area of the camera housing. A third support structure to which a third portion of the guide plate is connected may be disposed on the third opposing area.

The fourth corner area 424-4 may substantially face a fourth opposing area of the camera housing. For example, a fourth support structure to which a fourth portion of the guide plate is connected may be disposed on the fourth opposing area.

The camera assembly 420 further includes a chamfer area 425 disposed between the fourth corner area 424-4 and the top surface 421. The chamfer area 425 includes an area extending to be inclined downward from the top surface 421. The chamfer area 425 may define the top surface 421 and a first corner E1.

The first corner area 424-1 may be disposed at a position spaced a first distance L1 from the second rotation axis R2, and the second corner area 424-2 may be disposed at a position spaced a second distance L2 from the second rotation axis R2. The first distance L1 and the second distance L2 may be distances measured in a direction perpendicular to the second rotation axis R2.

The third corner area 424-3 may be disposed at a position spaced a third distance L3 from the first rotation axis R1, and the fourth coiner area 424-4 may be disposed at a position spaced a fourth distance L4 from the rotation axis R1. The third distance L3 and the fourth distance L4 may be distances measured in a direction perpendicular to the second rotation axis R2. The fourth distance L4 may be greater than the third distance L3. That is, the camera assembly 420 may have a substantially rectangular shape. If a virtual plane P including the optical axis L of the lens 431 and having a normal vector X1 substantially parallel to the X-axis is defined, a distance La from the virtual plane P to the fourth side area 423-4 may be greater than a distance Lb from the virtual plane to the third side area 423-3, due to the third magnetic body 433 and the plurality of balls 434, which are disposed on the side surface of the lens carrier 430.

The first corner E1 may be disposed at a position spaced a fifth distance L5 from the first rotation axis R1. The fifth distance L5 may be substantially the same as the third distance L3.

The camera assembly 420 may include at least one magnetic body related to the image stabilization function of the camera module 400. The camera assembly 420 may include two magnetic bodies, and the two magnetic bodies may be disposed on adjacent side areas of the camera assembly 420, respectively. In FIG. 11, a first magnetic body 481 is disposed on the first side area 423-1, and a second magnetic body 482 is disposed on a third side area 423-3.

The camera assembly 420 may include a coil and a magnetic body related to the auto focusing function of the camera module 400. At least one of the coil and the magnetic body may be disposed on a side area substantially facing the side area on which either the first magnetic body 481 or the second magnetic body 482 is disposed. In FIG. 11, the third coil 495 is disposed on the fourth side area 423-4 facing the third side area. 423-3 on which the second magnetic body 482 is disposed.

Each of the plurality of first balls 434-1 and the plurality of second balls 434-2 may be disposed on the corner area extending from the side area on which the coil (e.g., the third coil 495) related to the auto focusing function is disposed. The plurality of balls 434 are disposed adjacent to the fourth corner area 424-4 and the first corner area. 424-1, which extend from the fourth side area 423-4.

The chamfer area 425 is disposed between the fourth corner area 424-4 and the top surface 421 adjacent to the plurality of balls 434. The plurality of first balls 434-1 adjacent to the chamfer area 425 may be configured to include the relatively small number of balls compared to the plurality of second balls 434-2.

When the camera assembly 420 is viewed from above, the first corner E1 defined by the chamfer area 425 and the top surface 421 may overlap the plurality of first balls 434-1.

The chamfer area 425 may be disposed between the corner area, which has the largest rotation radius among rotation radii defined in each corner area 424, and the top surface 421. For example, the fourth corner area 424-4 may have the largest rotation radius by being farthest from the optical axis L of the lens 431 compared to other corner areas. The chamfer area 425 may be disposed between the fourth corner area 4244 and the top surface 421. In FIG. 11, because the chamfer area 425 is provided, a maximum rotation radius related to the first rotation axis R1 of the camera assembly 420 may be defined as a fifth distance L5 from the first rotation axis R1 to the chamfer area 425. Accordingly, in the rotation driving in which the camera assembly 420 rotates about the first rotation axis R1, the rotation radii on both sides of the first rotation axis R1 may be substantially the same.

Figure 12A:
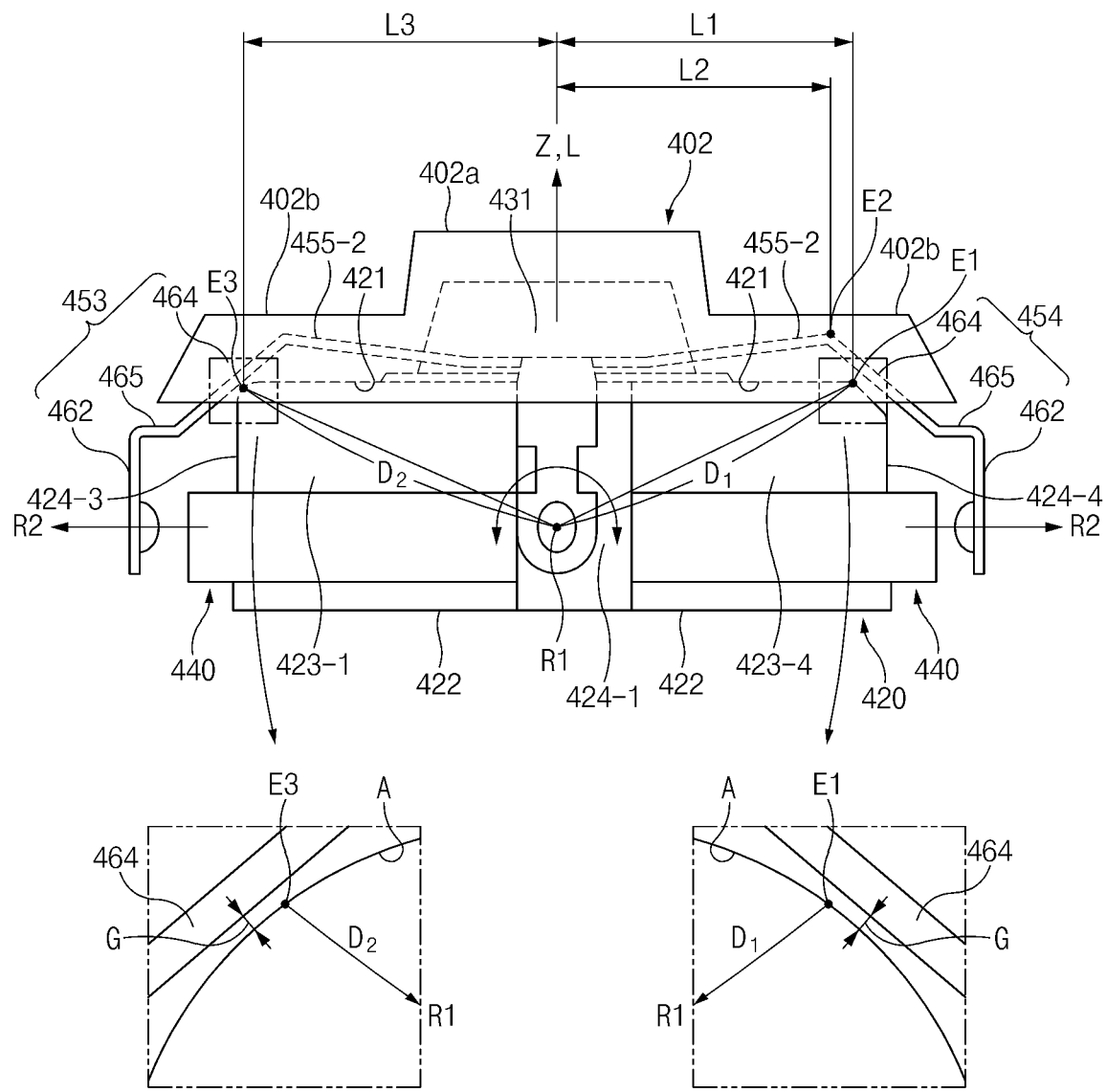
FIGS. 12A, 12B, and 12C illustrate a guide plate, a second cover, and a camera assembly of a camera module according to an embodiment.
Figure 12B:
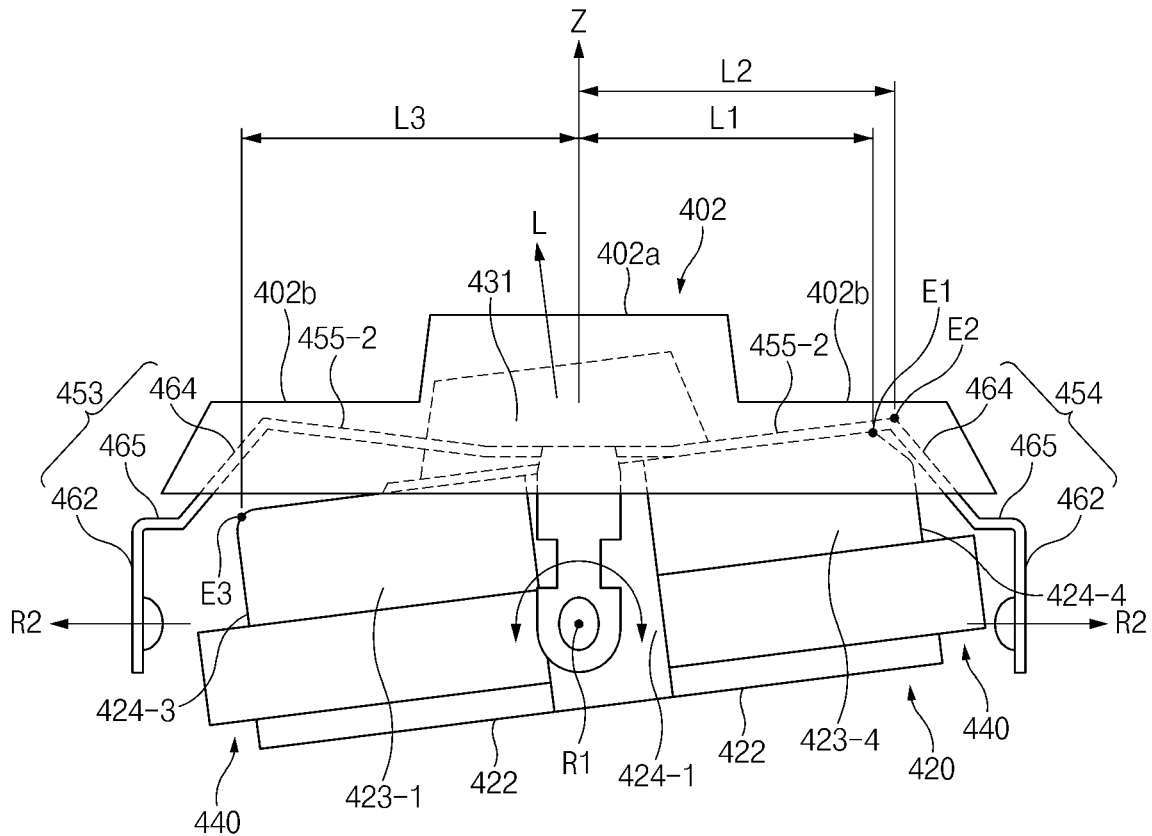
Figure 12C:
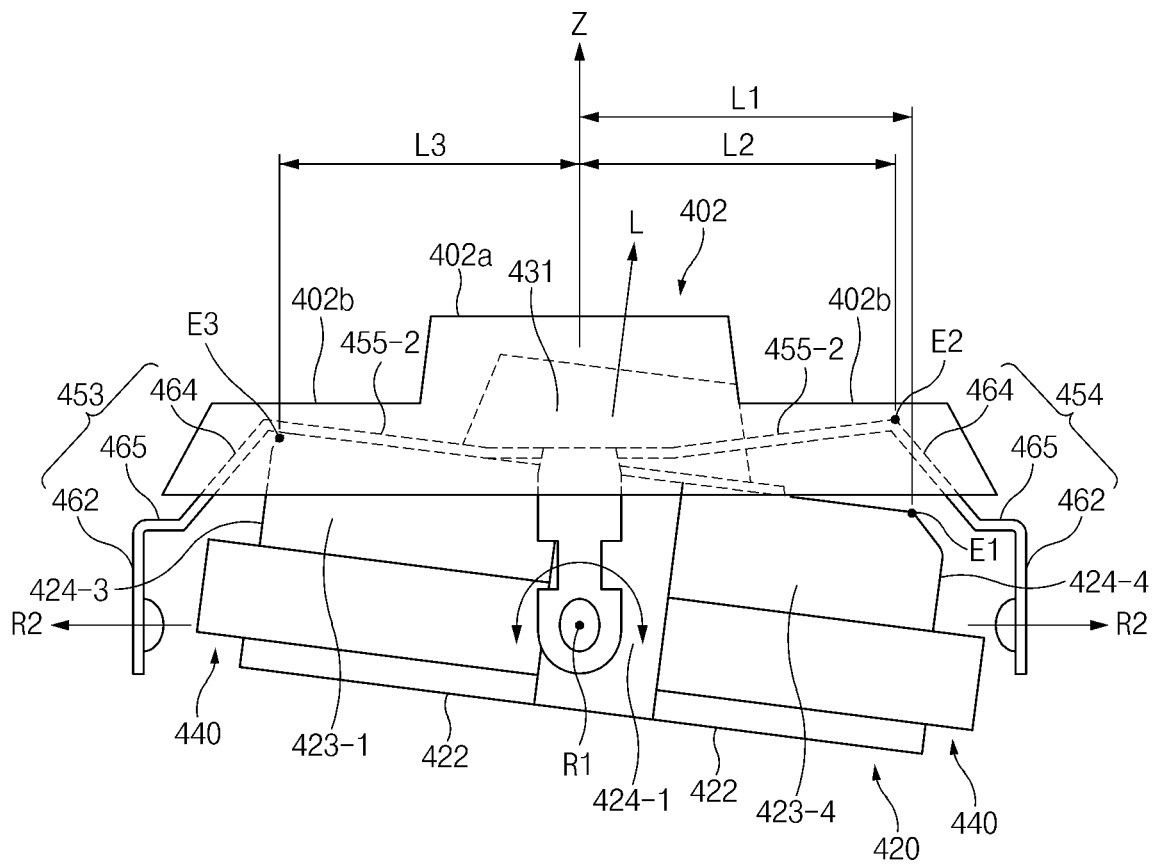

FIGS. 12A, 12B, and 12C illustrate a guide plate, a second cover, and a camera assembly of a camera module according to an embodiment. More specifically FIG. 12A illustrates a basic state, FIG. 12B illustrates a rotation state in a first rotation direction (e.g., a counterclockwise direction) with respect to a first rotation axis, and FIG. 12C illustrates a rotation state in a second rotation direction (e.g., a clockwise direction) with respect to the first rotation axis.

Each of FIGS. 12A, 12B, and 12C illustrate a side view from a direction A of FIG. 11. Because components of FIGS. 12A, 12B, and 12C may be similar to those of FIGS. 6 and 11, repetitive descriptions of these components are omitted below.

Referring to FIG. 12, the camera assembly 420 may include a top surface 421 substantially facing the guide plate 450, a bottom surface 422 facing the top surface 421, and a side surface 423 and a corner area 424, which surround an area between the top surface 421 and the bottom surface 422.

Referring to FIG. 12A, the camera assembly 420 may rotate about the first rotation axis R1 relative to the guide plate 450. The guide plate 450 may be fixed to the first camera housing 410.

The first rotation axis R1 may be defined on the first corner area 424-1. The first corner area. 424-1 may be disposed between the first side area 423-1 and the fourth side area 423-4. The second rotation axis R2 may be defined to pass through the third corner area 424-3 and the fourth corner area 424-4.

The second central portion 455-2 may be configured to increase in gap with the top surface 421 from the optical axis L of the lens 431 toward the second rotation axis R2.

The gap between the second central portion 455-2 and the top surface 421 may increase from the optical axis L of the lens 431 toward the second rotation axis R2.

The second extension portion 464 may extend to be inclined from the second central portion 455-2. The second extension portion 464 may extend to be inclined from the second central portion 455-2 toward the first side area 423-1 and the fourth side area 423-4. The third extension portion 465 may extend to be inclined from the second extension portion 464 and may include a plane substantially facing the optical axis L of the lens 431. The second coupling portion 462 may extend to be inclined from the third extension portion 465 and may include a plane substantially facing the second rotation axis R2.

The second extension portion 464 and the second central portion 455-2 may define a second corner E2. The second corner E2 may overlap the second extension portion 464 or the second central portion 455-2 if the camera assembly 420 is viewed in the direction of the optical axis L of the lens 431.

The guide plate 450 may be disposed so that the third portion 453 and the fourth portion 454 are symmetrical to each other with respect to the optical axis L of the lens 431.

The second corner E2 included in the third portion 453 and the fourth portion 454 may overlap the second central portion 455-2 when the camera assembly 420 is viewed in the direction of the optical axis L of the lens 431. The basic state may include a state in which the optical axis L of the lens 431 and the Z-axis are substantially parallel to each other.

The top surface 421 and the second corner area 424-2 may define a third corner E3.

When the camera assembly 420 rotates about the first rotation axis R1, the first corner E1 may define a first maximum rotation radius D1 of the camera assembly 420, and the third corner E3 may define a second maximum rotation radius D2 of the camera assembly 420. As described above with reference to FIG. 11, the chamfer area 425 may be disposed between the fourth corner area 424-4 and the top surface 421 of the camera assembly 420 in order to reduce a difference between the first maximum rotation radius D1 and the second maximum rotation radius D2.

The first corner E1 may be spaced a first distance L1 from the Z-axis in the direction of the second rotation axis R2. The third corner E3 may be spaced a third distance L3 from the Z-axis in the direction of the second rotation axis R2. The second corner E2 included in each of the third portion 453 and the fourth portion 454 may be spaced a second distance L2 from the Z-axis in the direction of the second rotation axis R2. The first distance L1 may be greater than the second distance L2 and less than the third distance L3. In various embodiments, the third distance L3 may be greater than the first distance L1.

Referring to FIG. 12B, the second corner E2 included in the third portion 453 may overlap the second extension portion 464 when the camera assembly 420 is viewed in the optical axis direction L of the lens 431. The second corner E2 included in the fourth portion 454 may overlap the second central portion 455-2 when the camera assembly 420 is viewed in the direction of the optical axis L of the lens 431. In the first rotation state, the first distance L1 may decrease, and the third distance L3 may increase compared to the basic state of FIG. 12A. The first distance L1 may be less than the second distance L2, and the third distance L3 may be greater than the second distance L2.

Referring to FIG. 12C, the second corner E2 included in the third portion 453 may overlap the second central portion 455-2 when the camera assembly 420 is viewed in the optical axis direction L of the lens 431. The second corner E2 included in the fourth portion 454 may overlap the second extension portion 464 when the camera assembly 420 is viewed in the direction of the optical axis L of the lens 431. In the second rotation state, the first distance L1 may increase, and the third distance L3 may decrease compared to the basic state of FIG. 12A. The first distance L1 may be greater than the second distance L2, and the third distance L3 may be less than the second distance L2.

Referring to FIGS. 12B and 12C, at least a portion of the top surface 421 of the camera assembly 420 may be in contact with the guide plate 450. For example, the guide plate 450 may be configured so that the second central portion 455-2 is inclined upward at a predetermined angle toward the second rotation axis R2. The predetermined angle may be a maximum rotation angle at which the camera assembly 420 is capable of rotating about the first rotation axis R1. The guide plate 450 may be configured so that a spaced distance of the second central portion 455-2 from the top surface 421 of the camera assembly 420 further increases toward the second rotation axis R2. The spaced distance may be related to a rotation radius of the top surface 421 of the camera assembly 420. In an area of the top surface 421, which is further away from the lens 431, a change in height may be greater in the rotation state. In order to prevent collision between the guide plate 450 and the camera assembly 420 from occurring, the guide plate 450 may be configured to have a larger gap with the top surface 421 in a direction that is away from the lens 431.

The guide plate 450 may be configured to maintain a small gap with the first corner E1 and the third corner E3 in the basic state and the rotation state. This may optimize a movable space of the camera assembly 420 to reduce the size of the camera module 400. Referring to the enlarged view, the second extension portion 464 may be inclined to have as small gap G as possible with a virtual arc surface A defined by the first corner E1 or the third corner E3 from the first rotation axis R1.

The camera assembly 420 includes a holder 440 surrounding at least a portion of the side surface 423. The first magnetic body 481 and the second magnetic body 482 may be disposed on the holder 440. The holder 440 may be configured to have a height less than a height of the camera assembly 420. The height may be a length measured in the direction of the optical axis L of the lens 431. The guide plate 450 may be configured so that the second extension portion 464 and the third extension portion 465 are spaced a predetermined distance from the holder 440, The third extension portion 465 may extend from the second extension portion 464 in the direction of the second rotation axis R2, and an extension length may be related to a thickness of the holder 440 protruding from the camera assembly in the direction of the second rotation axis R2.

The camera module 400 furthers include a second cover 402. The second cover 402 includes a transparent area 402a, which is aligned with the lens and is transparent so that light is incident on the lens, and an opaque area 402b disposed on a peripheral portion of the transparent area 402a and covering at least a portion of the guide plate 450. The opaque area 402b may be inclined so that the cross-sectional area is wider toward the top surface 421. The opaque area 402b may be connected to the transparent area 402a to have a predetermined height difference.

Figure 13:
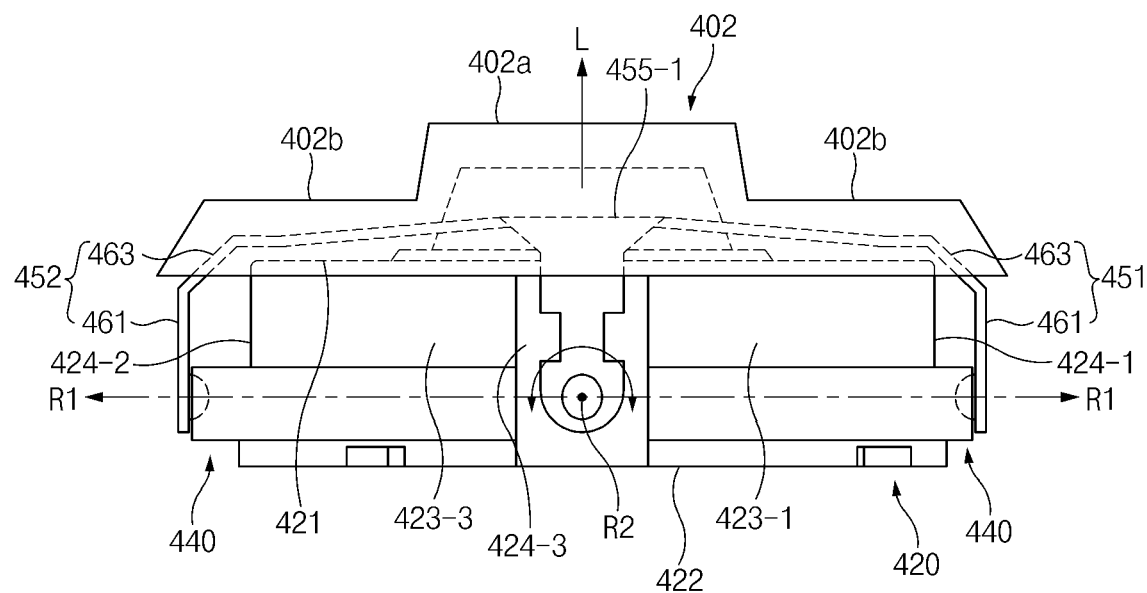
FIG. 13 illustrates a guide plate, a second cover, and a camera assembly of a camera module according to an embodiment.

FIG. 13 illustrates a guide plate, a second cover, and a camera assembly of a camera module according to an embodiment. FIG. 13 is a side view from direction B of FIG. 11.

Referring to FIG. 13, the second rotation axis R2 may be defined on the third corner area 424-3. The third corner area 424-3 may be disposed between the third side area 423-3 and the first side area 423-1. The first rotation axis R1 may be defined to pass through the second corner area 424-2 and the first corner area 424-1.

When the camera assembly 420 rotates about the second rotation axis R2, the camera assembly 420 may rotate together with the guide plate 450. Thus, the top surface 421 of the camera assembly 420 and the guide plate 450 may not collide with each other.

Each of the first portion 451 and the second portion 452 of the guide plate 450 include a first extension portion 463 extending from the first central portion 455-1 to the first coupling portion 461. The first extension portion 463 may be inclined in consideration of the protruding thickness of the holder 440. For example, the first extension portion 463 may extend to be inclined from the first central portion 455-1 toward the second corner area 424-2 and the first corner area 424-1. The extension length of the first extension portion 463 may be greater than the protruding thickness of the holder 440.

The opaque area 402b of the second cover 402 may be inclined so that the cross-sectional area increases from the transparent area 402a toward the top surface 421 of the camera assembly 420. The opaque area 402b may be inclined in consideration of the inclination of the first extension portion 463 of the guide plate 450. The opaque area 402b may be connected to the transparent area 402a to have a predetermined height difference.

A predetermined space may be defined between the second cover 402 and the guide plate 450. The predetermined space may be related to a maximum rotation angle at which the camera assembly 420 rotates about the second rotation axis R2.

Figure 14:
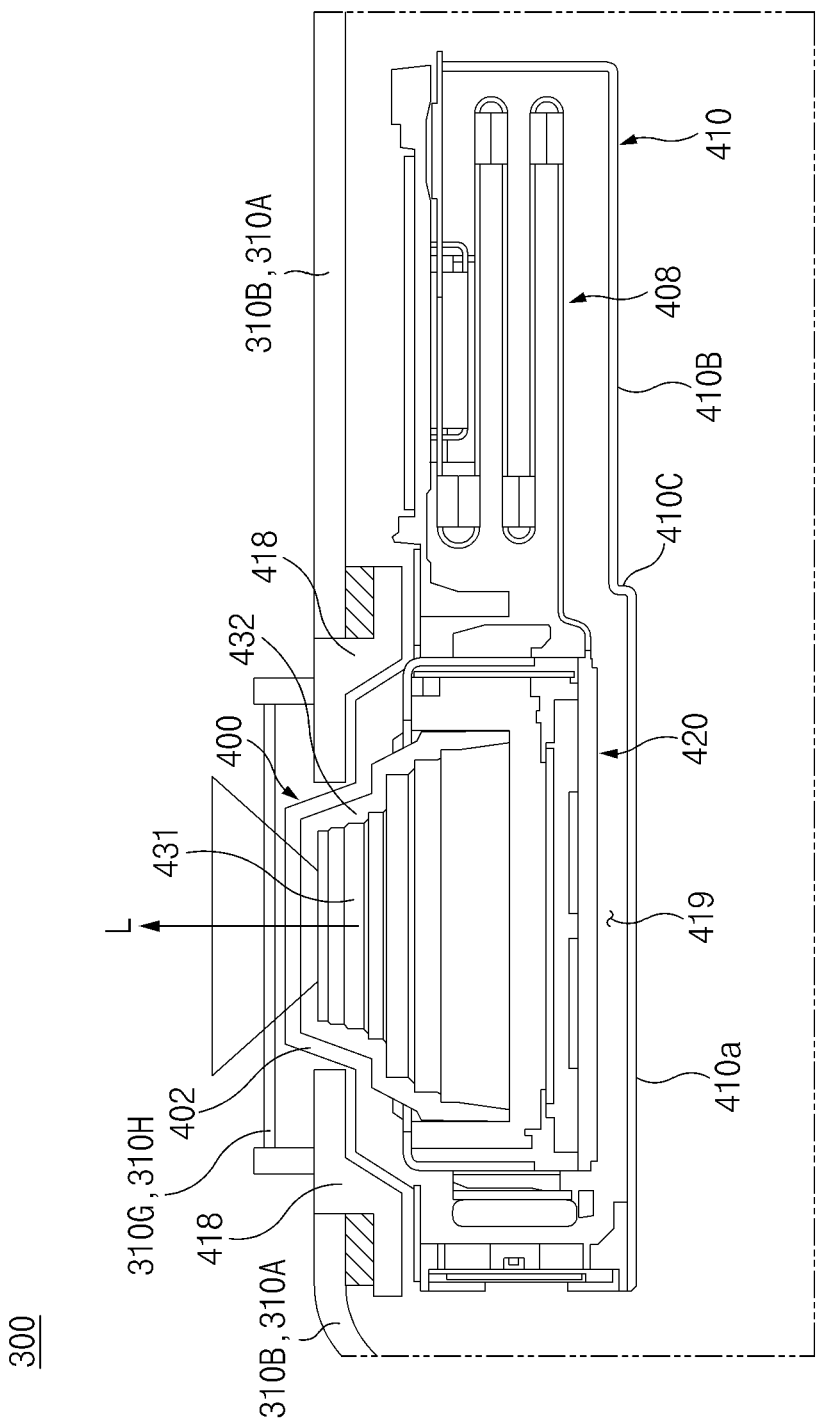
FIG. 14 illustrates an electronic device according to an embodiment.

FIG. 14 illustrates a cross-sectional view of an electronic device according to an embodiment. Specifically FIG. 14 illustrates a cross-sectional view taken along line A-A' of FIGS. 3A and 3B.

Referring to FIG. 14, the camera module 400 is disposed inside the electronic device 300. For example, the camera module 400 may be disposed inside the electronic device 300 so that the lens 431 is exposed through the camera areas 310G and 310H.

The camera module 400 includes a first camera housing 410, a camera assembly 420, and an FPCB 408. The first camera housing 410 includes a first portion 410a at which the camera assembly 420 is disposed and a second portion 410b at which the FPCB 408 is disposed. The first portion 451 and the second portion 452 may be connected to each other in a stepped manner. The first camera housing 410 further includes a second cover 402 that covers the lens 431 and the lens barrel 432. A space 419 in which the camera assembly 420 is rotatable may be defined inside the first portion 410a of the first camera housing 410.

The camera areas 310G and 310H may be disposed above the lens barrel 432 to cover the lens 431. The camera areas 310G and 310H may be provided to be transparent. A decor member 418 may be disposed around the lens barrel 432. The decor member 418 may be disposed between the camera areas 310G and 310H and the second cover 402. The decor member 418 may be provided to be opaque so that the camera module 400 other than the lens 431 and the lens barrel 432 is not exposed to the outside. The decor member 418 may support a member of which a portion supports the camera areas 310G and 310H, and a remaining portion defines the surfaces 310A and 310B of the electronic device 300.

At least portions of the lens 431 and the lens barrel 432 of the camera module 400 may protrude through the surfaces 310A and 310B of the electronic device 300. In order to reduce the protruding height, the first portion 451 of the first camera housing 410 may be connected in a manner 410c in which the first portion 451 is stepped 410c with respect to the second portion 452 in the inner direction of the electronic device 300. Therefore, the first portion 451 having a relatively high height (e.g., a height in the optical axis direction L) may be disposed inside the electronic device 300 in order to reduce the protruding height.

According to an embodiment, a camera module includes a camera housing; a camera assembly which includes a lens and an image sensor and of which at least a portion is disposed inside the camera housing; and a guide plate connected to the camera assembly and the camera housing so that the camera assembly is rotatable with respect to each of a first rotation axis R1 and a second rotation axis R2, which are substantially perpendicular to an optical axis L of the lens, wherein the guide plate may include a central portion disposed in a peripheral portion of the lens, a first portion and a second portion, which extend from the central portion in a direction of the first rotation axis R1 and are rotatably connected to the camera assembly, and a third portion and a fourth portion, which extend from the central portion in a direction of the second rotation axis R2 and are rotatably connected to the camera housing, wherein each of the first portion and the second portion may include a first coupling portion coupled to the camera housing and a first extension portion extending from the central portion to the first coupling portion and extending to be inclined from the central portion, and wherein each of the third portion and the fourth portion may include a second coupling portion coupled to the camera housing and a second extension portion extending from the central portion to the second coupling portion and extending to be inclined from the central portion.

The central portion of the guide plate may include an opening region aligned with the lens, a first central portion extending from a peripheral portion of the opening region to the first extension portion, and a second central portion extending from the peripheral portion of the opening region to the second extension portion, wherein the first central portion may include a plane substantially facing the optical axis of the lens, and wherein the second central portion may be inclined upward toward the optical axis L of the lens from the peripheral portion of the opening region in the direction of the second rotation axis R2.

The camera assembly may include a top surface to which the lens is exposed, and wherein the second central portion of the guide plate is configured to increase in gap with the top surface from the peripheral portion of the opening region toward the second rotation axis R2.

Each of the third portion and the fourth portion of the guide plate may further include a third extension portion disposed between the second extension portion and the second coupling portion, wherein the third extension portion may include a plane substantially facing the optical axis L of the lens.

The camera assembly may include first support structures configured to rotatably support the first portion and the second portion of the guide plate, wherein each of the first support structures may include a first protruding portion protruding toward the optical axis of the lens in the direction of the first rotation axis Rh, and wherein each of the first portion and the second portion of the guide plate may include a first accommodation portion in which the first protruding portion is accommodated.

The camera housing 410 may include second support structures configured to rotatably support the third portion and the fourth portion of the guide plate, wherein each of the second support structures may include a second protruding portion protruding toward the optical axis of the lens in the direction of the second rotation axis R2, and wherein each of the third portion and the fourth portion of the guide plate may include a second accommodation portion in which the second protruding portion is accommodated.

The camera assembly may include a top surface to which the lens is exposed and which faces the optical axis of the lens, a bottom surface facing the top surface, and side surfaces disposed between the top surface and the bottom surface, and wherein the guide plate may be configured so that the central portion is disposed on the top surface, and each of the first portion, the second portion, the third portion, and the fourth portion extends from the top surface to the side surfaces.

Each of the side surfaces of the camera assembly may include a chamfer area extending to be inclined from the top surface and configured to define a first corner together with the top surface, wherein the chamfer area is disposed to face the second extension portion of the guide plate.

When the camera assembly is viewed in the direction of the optical axis L, the first corner E1 may overlap the central portion in a state in which the camera assembly maximally rotates in the first rotation direction with respect to the first rotation axis R1 and may overlap the second extension portion in a state in which the camera assembly maximally rotates in a second rotation direction that is opposite to the first rotation direction with respect to the first rotation axis R1.

The first corner E1 may be disposed at a position that is spaced a first distance from the optical axis L of the lens in the direction of the second rotation axis R2 in a state in which the camera assembly maximally rotates in the first rotation direction with respect to the first rotation axis R1 and may be disposed at a position that is spaced a second distance greater than the first distance from the optical axis of the lens in the direction of the second rotation axis R2 in a state in which the camera assembly maximally rotates in the second rotation direction with respect to the first rotation axis R1, wherein the guide plate may be configured so that a second corner E2 defined by the central portion and the second extension portion is disposed at a position that is spaced a third distance from the optical axis L of the lens in the direction of the second rotation axis R2 wherein the third distance is greater than the first distance and less than the second distance.

The camera assembly may include a top surface to which the lens is exposed and which faces the optical axis L of the lens, a bottom surface facing the top surface, and side surfaces disposed between the top surface and the bottom surface, wherein the side surfaces may include a first corner area disposed at one side in the direction of the first rotation axis R1, a second corner area disposed at the other side in the direction of the first rotation axis R1, a third corner area disposed at one side in the direction of the second rotation axis R2, and a fourth corner area disposed at the other side in the direction of the second rotation axis, wherein the first portion and the second portion of the guide plate are connected to the first corner area and the second corner area, respectively, and wherein the camera housing may include a third opposing area substantially facing the third corner area and a fourth opposing area substantially facing the fourth corner area, wherein the third portion and the fourth portion of the guide plate may be connected to the third opposing area and the fourth opposing area, respectively.

Each of the side surfaces may further include a chamfer area disposed between any one of the third corner area and the fourth corner area and the top surface.

The third corner area may be disposed at a position that is spaced a first distance from the optical axis L of the lens in the direction of the second rotation axis R2, wherein the fourth corner area may be disposed at a position that is spaced a second distance greater than the first distance from the optical axis L of the lens in the direction of the second rotation axis R2, and wherein the chamfer area may be disposed between the fourth corner area and the top surface.

According to an embodiment of the disclosure, a camera module includes a camera housing; a camera assembly which includes a lens and an image sensor and of which at least a portion is disposed inside the camera housing; and a guide plate connected to the camera assembly and the camera housing so that the camera assembly is rotatable with respect to each of a first rotation axis R1 and a second rotation axis R2, which are substantially perpendicular to an optical axis L of the lens, wherein the camera assembly may include a second camera housing in which the image sensor is disposed, a lens carrier of which at least a portion is disposed inside the second camera housing and which includes the lens, and a plurality of balls disposed between the lens carrier and the second camera housing, wherein the second camera housing may include a top surface to which the lens is exposed, a bottom surface facing the top surface, and side surfaces disposed between the top surface and the bottom surface, wherein the side surfaces may include a first corner area and a second corner area, which substantially face each other in the direction of the first rotation axis R1, and third corner area and the fourth corner area, which substantially face each other in a direction of the second rotation axis R2, wherein the plurality of balls may include a plurality of first balls adjacent to the fourth corner area and a plurality of second balls adjacent to the first corner area and including the more number of balls compared to the plurality of first balls, and wherein a chamfer area may be disposed between the fourth corner area and the top surface.

The chamfer area and the top surface may define a first corner, and when the camera assembly is viewed in the direction of the optical axis, the chamfer area may overlap the plurality of first balls.

A rotation center point C at which the optical axis L of the lens, the first rotation axis R1, and the second rotation axis R2 cross each other may be defined, wherein when the camera assembly rotates about the first rotation axis R1, the camera assembly may be configured so that the third corner area may has a first radius from the rotation center point C in the direction of the second rotation axis R2, and the fourth corner area has a second radius less than the first radius from the rotation center point in the direction of the second rotation axis.

In various embodiments, the side surfaces of the camera assembly may include a first side area disposed between the first corner area and the third corner area, a second side area disposed between the second corner area and the fourth corner area, a third side area disposed between the second corner area and the third corner area, and a fourth side area disposed between the first corner area and the fourth corner area, wherein the camera assembly may include a first magnetic body disposed on the first side area and a second magnetic body disposed on the third side area, wherein the camera housing may include a first coil substantially facing the first magnetic body and a second coil substantially facing the second magnetic body, and wherein the camera assembly may rotate about at least one of the first rotation axis R1 or the second rotation axis R2 by using the first coil and the second coil.

The camera assembly may include a third coil disposed on the fourth side area and a third magnetic body disposed on the lens carrier in order to substantially face the third coil, wherein the camera module may move the lens by using the third coil in a direction that is substantially parallel to the optical axis L of the lens.

According to an embodiment of the disclosure, a portable communication device includes: a camera housing; a camera assembly which includes a lens and an image sensor and of which at least a portion is disposed inside the camera housing; a guide plate connected to the camera assembly and the camera housing so that the camera assembly is rotatable with respect to each of a first rotation axis R1 and a second rotation axis R2, which are substantially perpendicular to an optical axis L of the lens, wherein the guide plate may include a first portion and a second portion, which are rotatably connected to the camera assembly, and a third portion and a fourth portion, which are rotatably connected to the camera housing; a PCB disposed in the camera housing in order to surround at least a portion of the camera assembly; a plurality of coils including a first coil disposed on a first area of the PCB, a second coil disposed on a second area of the PCB, and a third coil disposed on at least a portion of the camera assembly; and a processor electrically connected to the PCB, the first coil, the second coil, and the third coil, wherein the processor may perform a first function related to the camera assembly by rotating the camera assembly about at least one of the first rotation axis or the second rotation axis R2 by using at least one of the first coil or the second coil and perform a second function related to the camera assembly by moving the lens using the third coil in a direction that is substantially parallel to the optical axis L of the lens.

The portable communication device may be set so that when the processor allows the camera assembly to rotate about the first rotation axis R1 corresponding to the first portion and the second portion of the guide plate, the camera assembly relatively rotates about the first rotation axis R1 with respect to the first portion and the second portion, and when the processor allows the camera assembly to rotate about the second rotation axis R2 corresponding to the third portion and the fourth portion of the guide plate, the camera assembly relatively rotates about the second rotation axis R2 together with at least a portion of the guide plate.

The first function may include a function related to auto focusing, and the second function may include a function related to image stabilization.

A camera module according to an embodiment of the disclosure may provide the function related to the image stabilization in addition to the function related to the auto focusing.

In addition, the various effects that are directly or indirectly identified through the disclosure may be provided.

While the disclosure has been shown and described above with reference to certain embodiments thereof, it will be understood by those skilled in the art that various changes in form and details may be made therein without departing from the spirit and scope of the disclosure as defined by the appended claims and their equivalents.

What is claimed is:

1. A camera module, comprising:
   a camera housing;
   a camera assembly including a lens, the camera assembly being accommodated in the camera housing and being rotatable about a first axis and a second axis substantially perpendicular to an optical axis of the lens with respect to the camera housing, and
   a guide plate connected to the camera assembly and the camera housing,
   wherein the camera assembly further includes a first corner area and a second corner area substantially facing a direction of the first axis and facing each other, and a third corner area and a fourth corner area substantially facing a direction of the second axis and facing each other,
   wherein the fourth corner area includes a chamfer area formed therein, wherein the guide plate includes a first portion and a second portion rotatably connected to the camera assembly about the first axis, and a third portion and a fourth portion rotatably connected to the camera housing about the second axis, and wherein at least a portion of the first portion faces and is spaced apart from the first corner area, at least a portion of the second portion faces and is spaced apart from the second corner area, at least a portion of the third portion faces and is spaced apart from the third corner area, and at least a portion of the fourth portion faces and is spaced apart from the fourth corner area.

2. The camera module of claim 1, wherein a first distance between the optical axis of the lens and the fourth corner area is longer than a second distance between the optical axis of the lens and the third corner area.

3. The camera module of claim 2, wherein a third distance between the optical axis of the lens and an inner periphery of the chamfer area is shorter than or equal to the second distance, and wherein the inner periphery of the chamfer area includes an edge on which a top surface of the camera assembly facing the optical axis and the chamfer area are connected.

4. The camera module of claim 1, wherein the chamfer area is formed to avoid hindering movement of the fourth corner area toward the guide while the camera assembly is rotated about the first axis.

5. The camera module of claim 1, wherein the guide plate further includes a central portion from which the first portion, the second portion, the third portion, and the fourth portion are extended, wherein each of the first portion and the second portion of the guide plate includes a first coupling portion rotatably coupled to the camera assembly and a first extension portion extending from the central portion to the first coupling portion, and wherein each of the third portion and the fourth portion of the guide plate includes a second coupling portion rotatably coupled to the camera housing and a second extension portion extending from the central portion to the second coupling portion.

6. The camera module of claim 5, wherein the first extension portion of the first portion is diagonally spaced apart from the first corner area, the first extension portion of the second portion is diagonally spaced apart from the second corner area, the second extension portion of the third portion is diagonally spaced apart from the third corner area, and the second extension portion of the fourth portion is diagonally spaced apart from the fourth corner area.

7. The camera module of claim 5, wherein the central portion includes a first flat portion corresponding to the first corner area, a second flat portion corresponding to the second corner area, a first inclined portion corresponding to the third corner area, and a second inclined portion corresponding to the fourth corner area.

8. The camera module of claim 7, wherein the first inclined portion is inclined above the third corner area by a specified angle and connected with the third portion, and the second inclined portion is inclined above the fourth corner area by the specified angle and connected with the fourth portion.

9. The camera module of claim 7, wherein the first inclined portion and the second inclined portion are inclined by a specified angle such that at least one portion of the camera assembly is in contact with a corresponding one of the first inclined portion and the second inclined portion while the camera assembly is rotated about the first axis.

10. The camera module of claim 5, wherein the chamfer area partially overlaps the second extension portion of the fourth portion in a direction of the optical axis of the lens.

11. The camera module of claim 5, wherein the guide plate further includes an opening formed in the central portion through which a lens assembly including the lens is protruded.

12. The camera module of claim 1, wherein the camera assembly further includes a magnet and a coil located between the first corner area and the fourth corner area, wherein the magnet and the coil are configured to move the lens in a direction of the optical axis of the lens.

13. A portable communication device, comprising:
a display; and
a camera module including:
  a camera housing;
  a camera assembly including a lens, the camera assembly being accommodated in the camera housing and being rotatable about a first axis and a second axis substantially perpendicular to an optical axis of the lens with respect to the camera housing, and
  a guide plate connected to the camera assembly and the camera housing,
wherein the camera assembly further includes a first corner area and a second corner area substantially facing a direction of the first axis and facing each other, and a third corner area and a fourth corner area substantially facing a direction of the second axis and facing each other,
wherein the fourth corner area includes a chamfer area formed therein,
wherein the guide plate includes a first portion and a second portion rotatably connected to the camera assembly about the first axis, and a third portion and a fourth portion rotatably connected to the camera housing about the second axis, and
wherein at least a portion of the first portion faces and is spaced apart from the first corner area, at least a portion of the second portion faces and is spaced apart from the second corner area, at least a portion of the third portion faces and is spaced apart from the third corner area, and at least a portion of the fourth portion faces and is spaced apart from the fourth corner area.

14. The portable communication device of claim 13, wherein a first distance between the optical axis of the lens and the fourth corner area is longer than a second distance between the optical axis of the lens and the third corner area.

15. The portable communication device of claim 14, wherein a third distance between the optical axis of the lens and an inner periphery of the chamfer area is shorter than or equal to the second distance, and wherein the inner periphery of the chamfer area includes an edge on which a top surface of the camera assembly facing the optical axis and the chamfer area are connected.

16. The portable communication device of claim 13, wherein the chamfer area is formed to avoid hindering movement of the fourth corner area toward the guide while the camera assembly is rotated about the first axis.

17. The portable communication device of claim 13, wherein the guide plate further includes a central portion from which the first portion, the second portion, the third portion, and the fourth portion are extended, wherein each of the first portion and the second portion of the guide plate includes a first coupling portion rotatably coupled to the camera assembly and a first extension portion extending from the central portion to the first coupling portion, and wherein each of the third portion and the fourth portion of the guide plate includes a second coupling portion rotatably coupled to the camera housing and a second extension portion extending from the central portion to the second coupling portion.

18. The portable communication device of claim 17, wherein the central portion includes a first flat portion corresponding to the first corner area, a second flat portion corresponding to the second corner area, a first inclined portion corresponding to the third corner area, and a second inclined portion corresponding to the fourth corner area, and wherein the first inclined portion is inclined above the third corner area by a specified angle and connected with the third portion, and the second inclined portion is inclined above the fourth corner area by the specified angle and connected with the fourth portion.

19. The portable communication device of claim 18, wherein the first inclined portion and the second inclined portion are inclined by the specified angle such that at least one portion of the camera assembly is in contact with a corresponding one of the first inclined portion and the second inclined portion while the camera assembly is rotated about the first axis.

20. The portable communication device of claim 17, wherein the chamfer area partially overlaps the second extension portion of the fourth portion in a direction of the optical axis of the lens.

\* \* \* \* \*